United States Patent
Ramirez et al.

(10) Patent No.: US 7,656,942 B2
(45) Date of Patent: Feb. 2, 2010

(54) DENOISING SIGNALS CONTAINING IMPULSE NOISE

(75) Inventors: Ignacio Ramirez, Montevideo (UY); Erik Ordentlich, San Jose, CA (US); Gadiel Seroussi, Cupertino, CA (US); Marcelo Weinberger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 11/490,725

(22) Filed: Jul. 20, 2006

(65) Prior Publication Data

US 2008/0031315 A1 Feb. 7, 2008

(51) Int. Cl.
*H03H 7/30* (2006.01)
(52) U.S. Cl. .................... 375/232; 375/240.12; 375/284
(58) Field of Classification Search ................. 375/346, 375/240.12, 240.22, 278, 284
See application file for complete search history.

(56) References Cited

U.S. PATENT DOCUMENTS 5,287,200 A * 2/1994 Sullivan et al. ............. 382/251

OTHER PUBLICATIONS

Pok, Gouchol et al., "Selective Removal of Impulse Noise Based on Homogeneity Level Information" IEEE Transactions on Image Processing, vol. 12, No. 1 (2003) pp. 85-92.

* cited by examiner

*Primary Examiner*—Emmanuel Bayard

(57) ABSTRACT

A denoising process models a noisy signal using classes and subclasses of symbol contexts. The process generates class count vectors having components that combine occurrence counts for different symbols in different contexts. Biases determined separately for each subclass and a fixed predictor indicate which symbol occurrence counts for different context are combined in the same component of a class count vector. For impulse noise, the bias for a subclass can be the average error that results when the fixed predictor predicts non-noisy symbols found in contexts of the context subclass. Denoising of impulse noise can select replacement symbols without matrix multiplication or a channel matrix inverse by evaluating distributions that result from subtracting error probabilities from probability vectors associated with respective contexts. Probability mass can be moved from adjacent components of the probability vector to assure that subtraction of the error probabilities leaves non-negative results.

23 Claims, 10 Drawing Sheets

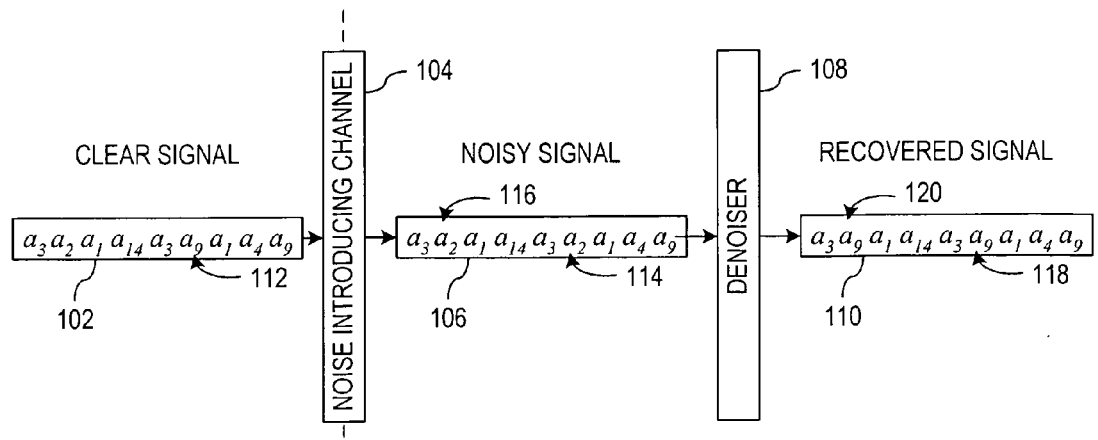
FIG. 1
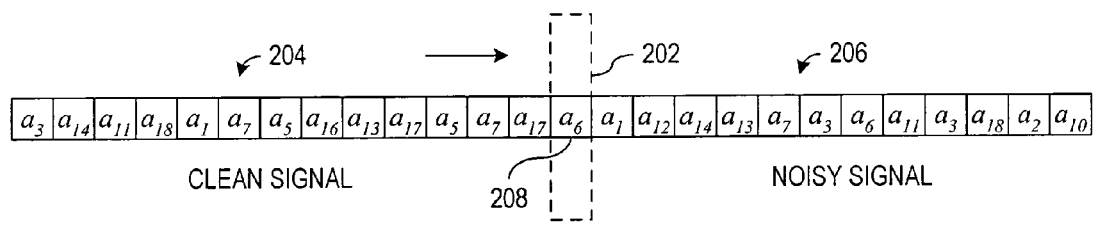
FIG. 2A
FIG. 2B $$\Pi = \begin{pmatrix} \pi_1 & \pi_2 & \pi_3 & & \pi_n \\ P_{a_1 \to a_1} & P_{a_1 \to a_2} & P_{a_1 \to a_3} & \cdots & P_{a_1 \to a_n} \\ P_{a_2 \to a_1} & P_{a_2 \to a_2} & P_{a_2 \to a_3} & \cdots & P_{a_2 \to a_n} \\ P_{a_3 \to a_1} & P_{a_3 \to a_2} & P_{a_3 \to a_3} & \cdots & P_{a_3 \to a_n} \\ \vdots & \vdots & \vdots & & \vdots \\ P_{a_n \to a_1} & P_{a_n \to a_2} & P_{a_n \to a_3} & \cdots & P_{a_n \to a_n} \end{pmatrix}$$

*FIG. 2C*

$$\Pi = \begin{pmatrix} 1-p_s & 0 & 0 & 0 & \ldots & p_s \\ p_p & 1-p & 0 & 0 & \ldots & p_s \\ p_p & 0 & 1-p & 0 & \ldots & p_s \\ p_p & 0 & 0 & 1-p & \ldots & p_s \\ \vdots & \vdots & \vdots & \vdots & & \vdots \\ p_p & 0 & 0 & 0 & \ldots & 1-p_p \end{pmatrix}$$

*FIG. 2D*

CLEAN COUNTS
$q_C[a_1], q_C[a_2], \ldots q_C[a_n]$
218

$\times \begin{bmatrix} P_{a_1 \to a_1} & P_{a_1 \to a_2} & \ldots P_{a_1 \to a_n} \\ P_{a_2 \to a_1} & P_{a_2 \to a_2} & \ldots P_{a_2 \to a_n} \\ \vdots & \vdots & \vdots \\ P_{a_n \to a_1} & P_{a_n \to a_2} & \ldots P_{a_n \to a_n} \end{bmatrix} \cong$

NOISY COUNTS
$m_N[a_1], m_N[a_2], \ldots m_N[a_n]$
222

$\Pi$

CLEAN  NOISY $q_C[a_1] \cdot P_{a_1 \to a_1} + q_C[a_2] \cdot P_{a_2 \to a_1} + q_C[a_3] \cdot P_{a_3 \to a_1} + \cdots \; q_C[a_n] \cdot P_{a_n \to a_1} \cong m_N[a_1]$ $q_C[a_1] \cdot P_{a_1 \to a_2} + q_C[a_2] \cdot P_{a_2 \to a_2} + q_C[a_3] \cdot P_{a_3 \to a_2} + \cdots \; q_C[a_n] \cdot P_{a_n \to a_2} \cong m_N[a_2]$ $\vdots$ $q_C[a_1] \cdot P_{a_1 \to a_n} + q_C[a_2] \cdot P_{a_2 \to a_n} + q_C[a_3] \cdot P_{a_3 \to a_n} + \cdots \; q_C[a_n] \cdot P_{a_n \to a_n} \cong m_N[a_2]$

*FIG. 2E*

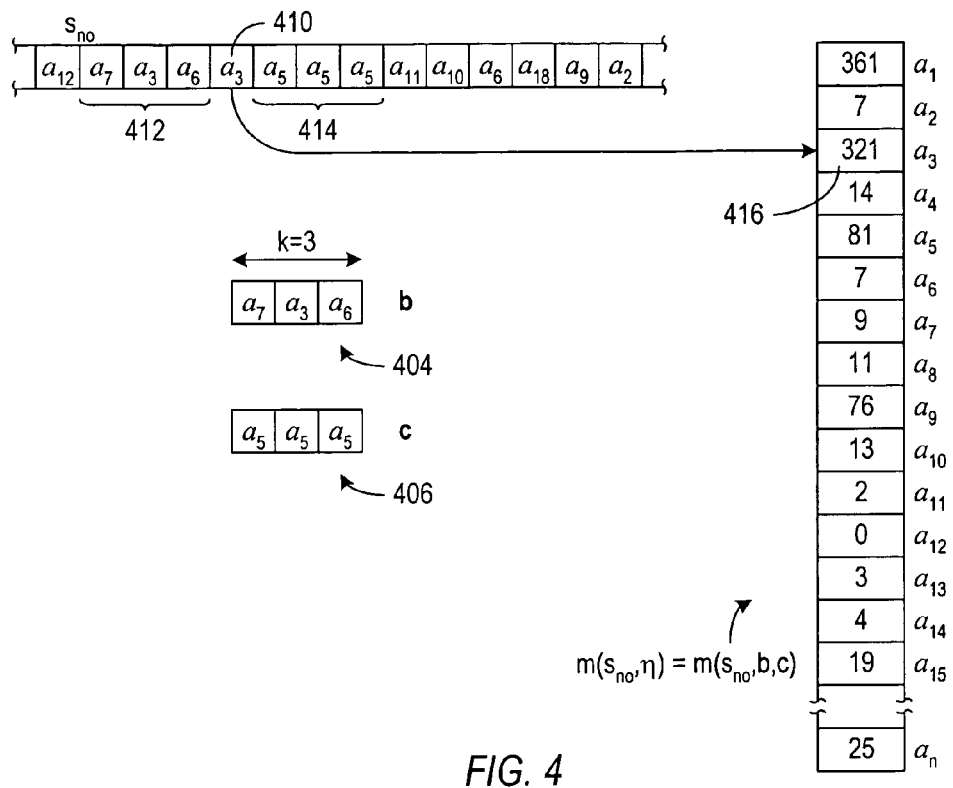
*FIG. 4*
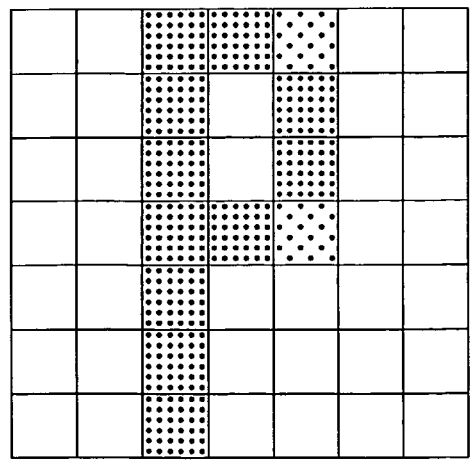
*FIG. 5A*  *FIG. 5B*

| 255 | 255 | 0 | 0 | 239 | 255 | 255 |
|---|---|---|---|---|---|---|
| 255 | 255 | 0 | 255 | 239 | 255 | 255 |
| 239 | 255 | 0 | 255 | 0 | 255 | 255 |
| 255 | 255 | 0 | 0 | 127 | 255 | 255 |
| 255 | 255 | 0 | 255 | 255 | 255 | 239 |
| 255 | 255 | 16 | 255 | 255 | 255 | 255 |
| 255 | 31 | 0 | 255 | 255 | 255 | 255 |

*FIG. 5C*

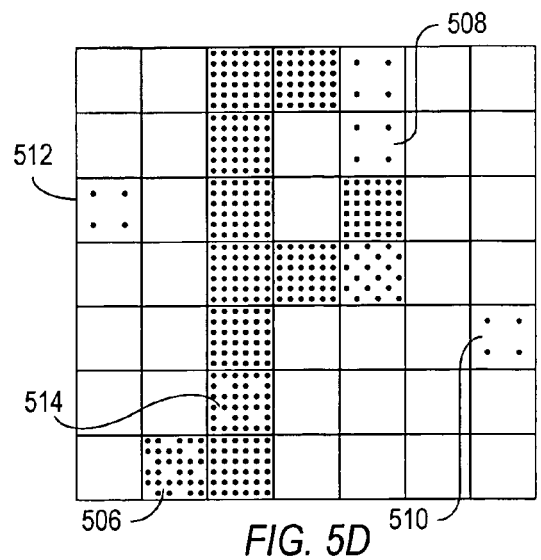

*FIG. 5D*

$$\Lambda = \begin{bmatrix} \lambda_1 & \lambda_2 & \lambda_3 & \cdots & \lambda_n \\ d_{a_1 \to a_1} & d_{a_1 \to a_2} & d_{a_1 \to a_3} & \cdots & d_{a_1 \to a_n} \\ d_{a_2 \to a_1} & d_{a_2 \to a_2} & d_{a_2 \to a_3} & \cdots & d_{a_2 \to a_n} \\ d_{a_3 \to a_1} & d_{a_3 \to a_2} & d_{a_3 \to a_3} & \cdots & d_{a_3 \to a_n} \\ \vdots & \vdots & \vdots & & \vdots \\ d_{a_n \to a_1} & d_{a_n \to a_2} & d_{a_n \to a_3} & \cdots & d_{a_n \to a_n} \end{bmatrix}$$

*FIG. 6*

$$\underbrace{\begin{bmatrix} d_{a_1 \to a_X} \\ d_{a_2 \to a_X} \\ d_{a_3 \to a_X} \\ \vdots \\ d_{a_n \to a_X} \end{bmatrix}}_{\lambda_x} \odot \underbrace{\begin{bmatrix} P_{a_1 \to a_\alpha} \\ P_{a_2 \to a_\alpha} \\ P_{a_3 \to a_\alpha} \\ \vdots \\ P_{a_n \to a_\alpha} \end{bmatrix}}_{\pi_\alpha} = \underbrace{\begin{bmatrix} d_{a_1 \to a_X} \cdot P_{a_1 \to a_\alpha} \\ d_{a_2 \to a_X} \cdot P_{a_2 \to a_\alpha} \\ d_{a_3 \to a_X} \cdot P_{a_3 \to a_\alpha} \\ \vdots \\ d_{a_n \to a_X} \cdot P_{a_n \to a_\alpha} \end{bmatrix}}_{\lambda_x \odot \pi_\alpha}$$

*FIG. 7*

| 0 | 2 | 4 | 6 | 8 | 10 | 12 | 14 | 16 | 18 | 20 | 22 |
|---|---|---|---|---|---|---|---|---|---|---|---|
| 2 | 4 | 255 | 8 | 10 | 12 | 14 | 16 | 18 | 20 | 22 | 24 |
| 4 | 6 | 8 | 10 | 12 | 14 | 0 | 18 | 20 | 22 | 24 | 26 |
| 6 | 8 | 10 | 12 | 14 | 16 | 18 | 20 | 22 | 24 | 26 | 28 |
| 8 | 10 | 73 | 133 | 134 | 78 | 20 | 22 | 24 | 26 | 28 | 30 |
| 10 | 12 | 133 | 255 | 255 | 138 | 22 | 24 | 255 | 28 | 30 | 32 |
| 12 | 14 | 134 | 255 | 255 | 139 | 24 | 26 | 28 | 30 | 32 | 0 |
| 14 | 16 | 78 | 138 | 139 | 82 | 26 | 28 | 30 | 32 | 34 | 36 |
| 16 | 18 | 20 | 22 | 24 | 26 | 28 | 30 | 32 | 34 | 255 | 38 |
| 18 | 20 | 22 | 24 | 0 | 28 | 30 | 255 | 34 | 36 | 38 | 40 |
| 20 | 22 | 24 | 26 | 28 | 30 | 32 | 0 | 36 | 38 | 40 | 42 |
| 22 | 24 | 26 | 28 | 30 | 32 | 34 | 36 | 38 | 40 | 42 | 44 |

$$\begin{pmatrix}20\\22\\24\\22\\26\\24\\26\\28\end{pmatrix} - \begin{pmatrix}24\\24\\24\\24\\24\\24\\24\\24\end{pmatrix} = \begin{pmatrix}-4\\-2\\0\\-2\\2\\0\\2\\4\end{pmatrix} \qquad \begin{pmatrix}32\\34\\36\\34\\38\\36\\38\\40\end{pmatrix} - \begin{pmatrix}36\\36\\36\\36\\36\\36\\36\\36\end{pmatrix} = \begin{pmatrix}-4\\-2\\0\\-2\\2\\0\\2\\4\end{pmatrix}$$

$$\eta_1 - \overline{\eta_1} = \Delta\eta_1 \rightarrow Q(\Delta\eta_1) = C(\eta_1) \qquad \eta_2 - \overline{\eta_2} = \Delta\eta_2 \rightarrow Q(\Delta\eta_2) = C(\eta_2)$$

$$\begin{pmatrix}8\\10\\73\\10\\133\\12\\14\\134\end{pmatrix} - \begin{pmatrix}49.25\\49.25\\49.25\\49.25\\49.25\\49.25\\49.25\\49.25\end{pmatrix} = \begin{pmatrix}-41.25\\-39.25\\23.75\\-39.25\\83.75\\-37.25\\-35.25\\84.75\end{pmatrix} \xrightarrow{\text{QUANTIZATION}} \begin{pmatrix}-40\\-40\\24\\-40\\80\\-40\\-32\\80\end{pmatrix}$$

$$\eta_3 - \overline{\eta_3} = \Delta\eta_3 \longrightarrow Q(\Delta\eta_3) = C(\eta_3)$$

*FIG. 11*

DENOISING SIGNALS CONTAINING IMPULSE NOISE

BACKGROUND

One particular type of noise often encountered in transmission or storage of data representing images is commonly referred to as impulse or salt-and-pepper noise. For common impulse noise, a noise-introducing channel randomly replaces a symbol value from a clean signal with the minimum or maximum symbol value, e.g., with 0 or 255 for data signals having 8-bit bytes as symbols. Denoising is an operation that attempts to remove the noise thus introduced, reconstructing, to the extent possible, the original data. Impulse noise presents several denoising challenges because impulse noise is not additive. Instead, some symbols from the clean signal are erased in the sense that the error symbols in the noisy signal provide no information regarding the corresponding symbols from the clean signal. Also, error symbols cannot be conclusively identified because the symbols that may be errors, e.g., 0 and 255, may instead be the correct symbols from the clean signal. Denoising systems and methods for addressing the challenges that impulse noise represents are thus sought.

BRIEF DESCRIPTION OF THE DRAWINGS

FIG. 1 illustrates introduction of noise into a clean signal to produce a noisy signal and subsequent denoising of the noisy signal to produce a recovered signal.

FIGS. 2A, 2B, 2C, 2D, and 2E illustrate the effect of a noise-introducing channel on a signal and the use of a channel matrix to characterize the noise-introducing channel.

FIG. 4 illustrates a convenient mathematical notation and data structure representing a portion of a table constructed by a discrete, universal denoiser, as described with reference to FIGS. 3A to 3D.

FIGS. 5A, 5B, 5C, and 5D illustrate the concept of symbol-corruption-related distortion in a noisy or recovered signal.

FIG. 6 displays one form of a symbol-transformation distortion matrix $\Lambda$.

FIG. 7 illustrates computation of the relative distortion expected from replacing a symbol "$a_\alpha$" in a received, noisy signal by the symbol "$a_x$."

FIG. 11 illustrates an embodiment of the invention that determines difference contexts and context classes when denoising a continuous tone image.

Use of the same reference symbols in different figures indicates similar or identical items.

DETAILED DESCRIPTION

Figure 3A:
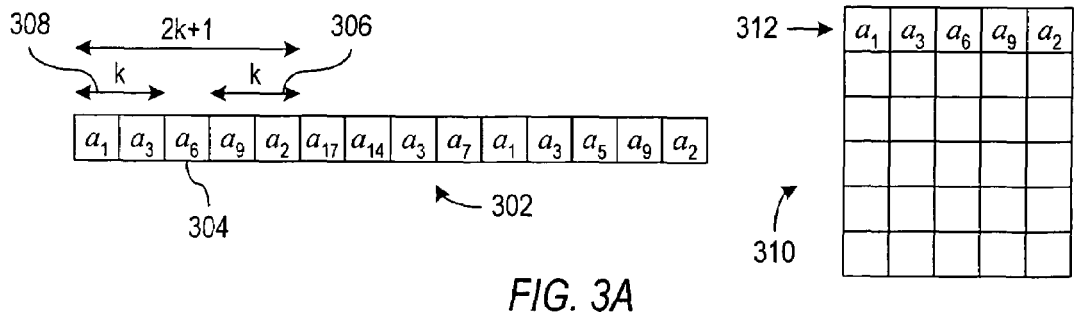
FIGS. 3A, 3B, 3C, and 3D illustrate a context-based, sliding window approach by which a discrete, universal denoiser characterizes the occurrences of symbols in a noisy signal.

Embodiments disclosed here are related to denoising methods and systems in general and to systems and methods for removing impulse noise from data such as continuous tone images, audio data, and other data where neighboring data tends to be related. A first section below describes a general discrete, universal denoising method, referred to as "DUDE," a second section describes denoising data signals in which different contexts for symbols can provide information regarding the statistical characteristics of symbols in other contexts. A third section describes denoising of data signals containing impulse noise.

DUDE (or Discrete Universal DEnoising)

FIG. 1 illustrates introduction of noise into a clean signal 102 to produce a noisy signal 106 and subsequent denoising of noisy signal 106 to produce a recovered signal 110. For an illustrative example, signals 102, 106, and 110 are treated as linear, ordered sequences of symbols, such as a stream of audio data or alphanumeric characters that comprise a text file, but the data into which noise can be introduced include data representing two-dimensional images, video signals, multi-dimensional structures, and other types of transmitted information. In FIG. 1, signals 102, 106, and 110 are represented as sequences of symbols that are each members of an alphabet A containing n distinct symbols, where alphabet A is $\{a_1, a_2, a_3, \ldots a_n\}$. Note that the subscripts for the symbols refer to the positions of the respective symbols within an ordered list associated with the alphabet, and not to the positions of symbols in a signal. In FIG. 1, an initial, clean signal 102 includes an ordered sequence of nine symbols from the alphabet A. In normal circumstances, an input signal may have thousands, millions, or more symbols. Input signal 102 is short for illustrative convenience.

Clean signal 102 is transmitted or passed through a noise-introducing channel 104, producing noisy signal 106. In the example shown in FIG. 1, noisy signal 106 includes symbols from the same alphabet A as input signal 102, although, in general, the input symbols may be chosen from a different, equally sized or smaller alphabet than that from which the output symbols are selected. In the example shown in FIG. 1, noise-introducing channel 104 alters a symbol 112 having value $a_9$ in the clean signal 102 to produce a corresponding symbol 114 having value $a_2$ in the noisy signal 106.

There are many different types of noise-introducing channels, each type characterized by the types and magnitudes of noise that the noise-introducing channel introduces into a clean signal. Physical examples of noise-introducing channels include electronic communications media, data storage devices to which information is transferred and from which information is extracted, and transmission and reception of radio and television signals. One type of noise commonly referred to as impulse noise randomly replaces symbols from the clean signal with one or more specific values, typically the extreme values carried by the channel. For example, for an alphabet containing integer values from 0 to 255, a specific type of transmission error may randomly change a symbol from the clean signal into values 0, 255, or whatever value may correspond to a specific error condition in the noise-introducing channel. This type of impulse noise is sometimes referred to as salt-and-pepper noise, particularly for signals representing continuous tone images where the noise can appear in an image as randomly placed black or white pixels.

In order to achieve reasonable fidelity for display, broadcast, or storage of a signal transmitted through a noise-introducing channel, a denoising process may be undertaken to remove noise that the noise-introducing channel introduced. In FIG. 1, noisy signal 106 is passed through or processed by a denoiser 108 to produce recovered signal 110, which, when denoiser 108 is effective, is substantially closer to, or more perceptually similar to, the clean signal 102 than is the received noisy signal 106.

Many types of denoisers have been proposed, studied, and implemented. Some involve application of continuous mathematics, some involve detailed knowledge of the statistical properties of the originally transmitted clean signal, and some rely on detailed information concerning time and sequence-dependent behavior of the noise-introducing channel. In one embodiment, denoiser 108 is a discrete, universal denoiser, referred to as "DUDE." A DUDE is a type of denoiser that is discrete in the sense that the DUDE processes signals comprising discrete symbols using discrete rather than continuous mathematics. The DUDE is universal in that it asymptotically approaches the performance of an optimum denoiser employing knowledge of the clean-signal symbol-occurrence distributions without access to these distributions.

A DUDE implementation generally employs a model for the noise-introducing channel and a number of assumptions. For example, specific models, systems, and methods for denoising a channel that introduces impulse noise are discussed below. In general, DUDE 108 of FIG. 1 employs a strategy for denoising noisy signal 106 that considers a neighborhood or context η of each symbol. The dimension of the context/neighborhood in general depends on the relationship of symbols in a data set. For example, when the noisy signal represents a linear sequence of symbols, the context η generally includes one or more symbols preceding and following the symbol according to a left to right ordering of the symbols that the signal represents.

The two occurrences 114 and 116 of the symbol $a_2$ in the noisy signal 106 occur with the same single preceding-and-following-symbol context. Generally, a context may consist of an arbitrary number of neighboring symbols in various configurations; here two-symbol contexts are considered as an illustration. In particular, the context for occurrences 114 and 116 of the symbol $a_2$ in noisy signal 106 of the example in FIG. 1 is $[a_3, a_1]$. Denoiser 108 either leaves all occurrences of a particular symbol $a_i$ within a particular context unchanged, or changes all occurrences of that particular symbol $a_i$ within that particular context to a different symbol $a_j$. For example, denoiser 108 replaced all occurrences 114 and 116 of the symbol $a_2$ in noisy signal 106 within the context $[a_3, a_1]$ with occurrences 118 and 120 of the symbol $a_9$ in recovered signal 110. Thus, denoiser 108 does not necessarily produce a recovered signal that is identical to the clean signal 102, but instead produces a recovered signal 110 estimated to have less distortion relative to clean signal 102 than does noisy signal 106. In the above example, replacement of the second symbol $a_2$ at position 114 with the symbol $a_9$ restores the originally transmitted symbol at that position, but replacement of occurrence 116 of symbol $a_2$ in noisy signal 106 with the symbol $a_9$ introduces a new distortion. Denoiser 108 only replaces one symbol with another to produce recovered signal 110 when denoiser 108 estimates that the overall distortion of recovered signal 110 with respect to clean signal 102 will be less than the distortion of noisy signal 106 with respect to clean signal 102.

FIGS. 2A to 2E illustrate motivations for DUDE related to characteristics of the noise-introducing channel. DUDE assumes a memory-less channel. In other words, as shown in FIG. 2A, the noise-introducing channel 202 may be considered to act as a one-symbol window, or aperture, through which a clean signal 204 passes. The noise-introducing channel 202 has a probability of corrupting a target symbol from clean signal 204 by replacing the target symbol with another symbol in a noisy signal 206, and the probability of corrupting the target symbol depends neither on the history of symbols preceding the target symbol through noise-introducing channel 202 nor on the symbols that are subsequently transmitted through noise-introducing channel 202.

FIG. 2B shows a portion of a table 210 that stores the probabilities that any particular symbol $a_i$, from the alphabet A may be changed to a symbol $a_j$ during transmission through the noise-introducing channel. For example, in FIG. 2A, position 208 in clean signal 204 contains symbol $a_6$, which is passing through noise-introducing channel 202. Row 216 in table 210 contains the probabilities that symbols $a_1$ to $a_m$ will emerge from channel 202 when symbol $a_6$ enters channel 202. For example, the probability 212 that channel 202 will change the symbol $a_6$ to the symbol $a_1$ appears in the first cell of row 216 in table 210, indexed by the integers 6 and 1 corresponding to the order/indices of symbols $a_6$ and $a_1$ in the alphabet A. The probability 214 that symbol $a_6$ will be faithfully transferred, without corruption, through noise-introducing channel 202 appears in the table cell with indices (6, 6). Note that the sum of the probabilities in each row of the table 210 is 1.0, assuming the noise-introducing channel will transmit a given symbol either faithfully or as some other symbol $a_1$ to $a_m$ in an output alphabet.

Table 210 illustrates the example of probabilities characteristic of a channel that introduces impulse noise. In particular, the probabilities 212 and 218 of corrupting the clean signal by replacing a symbol with specific values corresponding to error conditions of the channel are relatively high when compared to probabilities of producing other corrupted symbol values. Channels introducing other types of noise such as Gaussian noise may have probabilities that vary more continuously and are generally peaked at the probability of faithful transmission. In general, a particular channel can introduce more than one type of noise including impulse noise with other types of noise.

As shown in FIG. 2C, table 210 of FIG. 2B can be alternatively expressed as a two-dimensional channel matrix Π, with the matrix element identified by indices (i, j) indicating the probability that the noise-introducing channel will transmit symbol $a_i$ as symbol $a_j$. Matrix Π has dimensions n×n assuming that the input and output alphabets are the same or at least contain the same number n of symbols. Note also that a column j in matrix Π may be referred to as a column vector $\pi_j$.

FIG. 2D illustrates an example of a channel matrix for a noise inducing channel that creates impulse noise. The channel matrix Π illustrated in FIG. 2D corresponds to non-additive noise that may result when symbol errors occur in the channel with a probability p and the respective probabilities of an error producing the error values, e.g., 0 and 255 for an alphabet corresponding to byte values, are $p_p$ and $p_s$ with $p = p_p + p_s$. In an exemplary embodiment, an error has an equal chance of producing either error value, so that each error probability $p_p$ or $p_s$ is equal to p/2.

As shown in FIG. 2E, a row vector 218 containing counts $q_C[a_1]$ to $q_C[a_n]$ of the number of each type of symbol in the clean signal can be multiplied by the symbol-transition-probability matrix Π to approximate a row vector 222 containing the actual occurrence counts $m_N[a_i]$ for the symbols $a_i$ in the noisy signal 206. The actual occurrence counts $m_N[a_1]$ to $m_N[a_n]$ of symbols $a_1$ to $a_n$ in the noisy signal 206 appear as components in the row vector $m_N$. The matrix multiplication is shown in expanded form below the matrix multiplication in FIG. 2E. Thus, in vector notation: $q_C \cdot \Pi \cong m_N$, where $q_C$ is a row vector containing the occurrence counts $q_C[a_i]$ of each symbol $a_i$ of the alphabet in the clean signal; and $m_N$ is a row vector containing the occurrence counts $m_N[a_i]$ of each symbol $a_i$ in the alphabet in the noisy signal.

The approximation symbol $\cong$ is employed in the equation $q_C \cdot \Pi \cong m_N$, because the probabilities in channel matrix $\Pi$ give only the expected frequency of a particular symbol substitution, while the actual symbol substitution effected by the noise-introducing channel is random and subject to statistical variations. In other words, the noise-introducing channel behaves randomly, rather than deterministically, and thus may produce different results each time a particular clean signal is transmitted through the noise-introducing channel. An error in the approximation can be obtained as the sum of the absolute values of the components of the difference between the left and right sides of the approximation and is generally small relative to the sequence length, e.g., on the order of the square root of the sequence length. Multiplying, from the right, both sides of the above equation by the inverse $\Pi^{-1}$ of matrix $\Pi$, assuming that matrix $\Pi$ is invertible, allows for calculation of an estimated row-vector count of the symbols in the clean signal $\hat{q}_c$, from the counts of the symbols in the noisy signal, as follows: $\hat{q}_c \cong m_N \cdot \Pi^{-1}$. In the case where the noisy symbol alphabet is larger than the clean symbol alphabet, it is assumed that matrix $\Pi$ is full-row-rank and the inverse $\Pi^{-1}$ in the above expression can be replaced by a generalized inverse, such as the Moore-Penrose generalized inverse.

The DUDE applies clean symbol count estimation on a per-context basis to obtain estimated counts of clean symbols occurring in particular noisy symbol contexts. The actual denoising of a noisy symbol is then determined from the noisy symbol's value, the resulting estimated context-dependent clean symbol counts, and a loss or distortion measure, in a manner described below.

As discussed above, the DUDE considers each symbol in a noisy signal within a context. In a one-dimensional signal such as that used for the example of FIG. 1, the context may be the values of a number of symbols preceding, following, or both preceding and following a currently considered symbol. In signals representing 2-dimensional or higher dimensional data structures, the context may be values of symbols in any of an almost limitless number of different types of neighborhoods surrounding a symbol. For example, in a 2-dimensional image, the context may be the eight pixel values surrounding a particular, interior pixel. For the description provided in this section, a 1-dimensional signal is commonly used for examples, but the DUDE can effectively denoise signals representing higher dimensional data structures such as data signals representing images.

In order to characterize the occurrences of symbols within contexts in a one-dimensional data structure, the DUDE needs to consider a number of symbols adjacent to each considered symbol. FIGS. 3A to 3D illustrate a context-based, sliding window approach by which the DUDE characterizes the occurrences of symbols in a noisy signal 302. FIGS. 3A to 3D all employ the same illustration conventions, which are described only for FIG. 3A, in the interest of brevity. In FIG. 3A, the DUDE begins analysis of noisy signal 302 in order to determine the occurrence counts of particular symbols within particular contexts within noisy signal 302. The one-dimensional DUDE employs a constant k to describe the length of a sequence of symbols preceding, and the length of a sequence of symbols subsequent to, a particular symbol that, together with the particular symbol form a symbol string of length 2k+1. In the example of FIGS. 3A to 3D, k has the value 2. Thus, a symbol preceded by a pair of symbols and succeeded by a pair of symbols forms a five-symbol string. In FIG. 3A, the symbol $a_6$ in position 304 occurs within a context of the succeeding two-symbol string $a_9a_2$ in positions 306 and is preceded by the two-symbol string $a_1a_3$ in positions 308. The symbol $a_6$ therefore occurs at least once in noisy signal 302 within the context $[a_1a_3, a_9a_2]$, or, equivalently, the symbol string $a_1a_3a_6a_9a_2$ occurs at least once in noisy signal 302. The occurrence of this string within noisy signal 302 can be listed as the first entry 312 in a table 310.

Figure 3B:
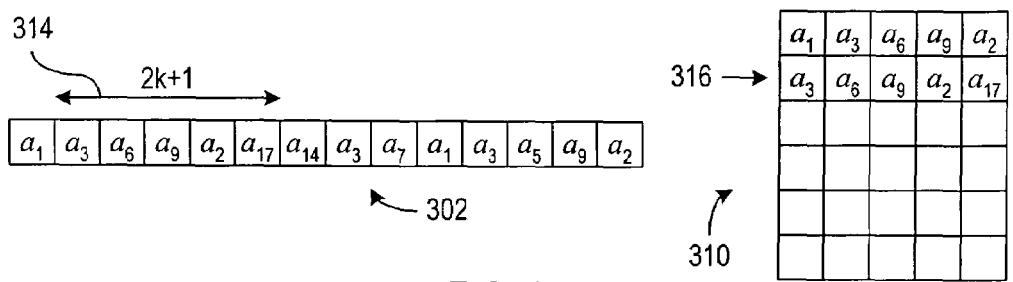
Figure 3C:
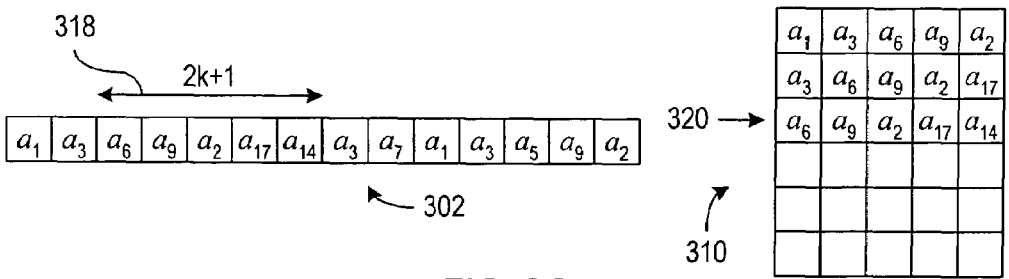
Figure 3D:
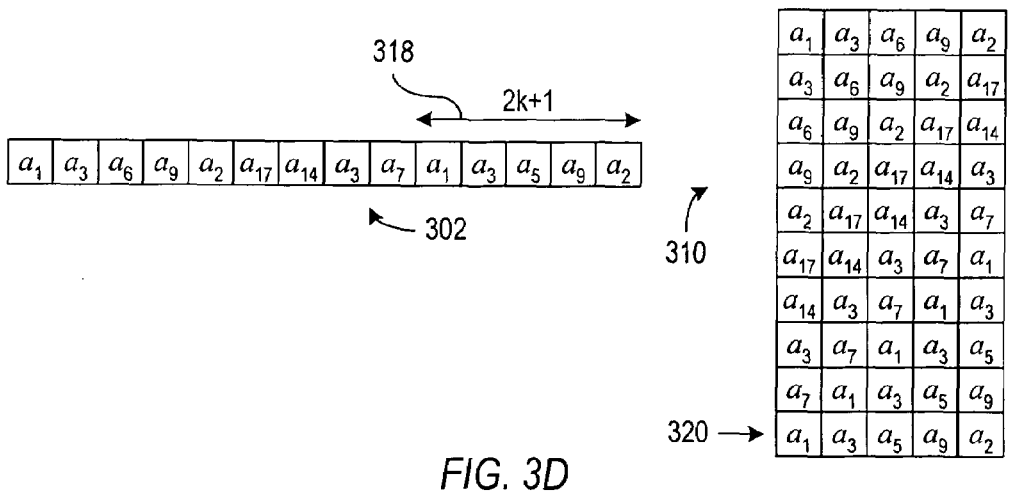

As shown in FIG. 3B, DUDE then slides the window of length 2k+1 rightward, by one symbol, to consider a second string 314 of length 2k+1. In this second string, the symbol $a_9$ appears within the context $[a_3a_6, a_2a_{17}]$. This second string 314 is entered into table 310 as a second entry 316. FIG. 3C shows detection of a third string 318 in noisy signal 302 and the corresponding entry 320 in table 310. FIG. 3D shows the table 310 after DUDE completes analysis of the short noisy signal 302. Although, in the examples shown in FIG. 3D, DUDE lists each five-symbol string as a separate entry in the table, in a more efficient implementation, DUDE enters each detected string only once in an index table, and increments an occurrence count each time the identical string is subsequently detected. For example, counts associated with a particular context can be indexed by the symbol found in that context. In this fashion, in a first or modeling pass, DUDE tabulates the counts or frequencies of symbols for each context.

FIG. 4 illustrates a convenient mathematical notation and data structure representing a portion of the table constructed by DUDE, as described with reference to FIGS. 3A to 3D. A column vector $m(s_{no}, \eta)$ or $m(s_{no}, b, c)$ in FIG. 4 represents counts of the occurrences within a noisy signal $s_{no}$ of each symbol in the alphabet A within a particular context $\eta$, represented by the k-length symbol vectors b and c for a one-dimensional noisy signal $s_{no}$. As will be understood by those of skill in the art, the counts in vector $m(s_{no}, \eta)$ may be normalized if desired to produce probability vectors. FIG. 4 illustrates an example in which the context $\eta$ for which the occurrence counts are tabulated in column vector $m(s_{no}, \eta)$ includes a symbol vector 404 and a symbol vector 406. This particular context $\eta$ can thus be denoted as $[a_7a_3a_6, a_5a_5a_5]$. In noisy signal $s_{no}$ of FIG. 4, the symbol $a_3$ in position 410 occurs within this context $\eta$ because the three symbols 412 to the left of position 410 and the three symbols 414 to the right of the position 410 match vectors 404 and 406. During analysis of the noisy signal $s_{no}$, count 416, which is the component of vector $m(s_{no}, \eta)$ corresponding to symbol value $a_3$, was incremented for the occurrence of $a_3$ at position 410 in context $[a_7a_3a_6, a_5a_5a_5]$ and for every other occurrences of the symbol $a_3$ in the context $[a_7a_3a_6, a_5a_5a_5]$. In other words, a symbol $a_3$ occurs within the context $[a_7a_3a_6, a_5a_5a_5]$ in the noisy signal $s_{no}$ 321 times in the example of FIG. 4. The counts for the occurrences of all other symbols $a_1$, $a_2$, and $a_4$ to $a_n$ in the context $\eta = [a_7a_3a_6, a_5a_5a_5]$ within noisy signal $s_{no}$ are recorded as the successive components of the column vector $m(s_{no}, [a_7a_3a_6, a_5a_5a_5])$. An individual count within a column vector $m(s_{no}, \eta)$ can be referred to using an array-like notation. For example, the count of the number of times that the symbol $a_3$ appears in the context $[a_7a_3a_6, a_5a_5a_5]$ within the noisy signal $s_{no}$, i.e., 321, can be referred to as $m(s_{no}, a_7a_3a_6, a_5a_5a_5)[a_3]$.

DUDE employs either a full or a partial set of column vectors for all detected contexts of selected type in the noisy signal in order to denoise the noisy signal. Note that an initial set of symbols at a boundary of a data set, e.g., close to the beginning and end of one-dimensional signal, are not counted in any column vector $m(s_{no}, \eta)$ because they lack sufficient neighboring symbols to have a context of the required type. However, as the size of the data set represented by the noisy signal for practical applications tends to be quite large and the context size tends to be relatively small, DUDE's failure to consider a few boundary symbols with respect to their occurrence within contexts makes almost no practical different in the outcome of the denoising operation.

FIGS. 5A to 5D illustrate the concept of symbol-corruption-related distortion in a noisy or recovered signal. The example of FIGS. 5A to 5D relates to a 256-value grayscale image of a letter. In FIG. 5A, the grayscale values for cells, or pixels, within a two-dimensional image 502 are shown, with the character portions of the symbol generally having a minimum grayscale value of 0 and the background pixels having a maximum grayscale value of 255, using a convention that the displayed brightness of the pixel increases with increasing numerical value. Visual display of the image represented by the two-dimensional grayscale signal in FIG. 5A is shown in FIG. 5B. The grayscale data in FIG. 5A is meant to represent a low resolution image of the letter "P." As shown in FIG. 5B, the image of the letter "P" is reasonably distinct, with reasonably high contrast.

FIG. 5C shows the grayscale data with noise introduced by transmission through a hypothetical noise-introducing channel. Comparison of FIG. 5C to FIG. 5A shows that there is marked difference between the grayscale values of certain cells, such as cell 506 before and after transmission. FIG. 5D shows a display of the grayscale data from FIG. 5C. The displayed image is not easily recognizable as the letter "P." In particular, two cells contribute greatly to the distortion: (1) cell 506, changed in transmission from the grayscale value "255" to the grayscale value "31"; and (2) cell 508, changed in transmission from the grayscale value "0" to the grayscale value "239." Other noise, such as the relatively small magnitude grayscale changes of cells 510 and 512, introduces relatively little distortion and would have not seriously impacted recognition of the letter "P." In this case, the distortion of the displayed image contributed by noise introduced into the grayscale data appears to be proportional to the magnitude of change in the grayscale value. Thus, the distorting effects of noise within symbols of a signal are not necessarily uniform. A noise-induced change of a transmitted symbol to a closely related, received symbol may produce far less distortion than a noise-induced change of a transmitted symbol to a very different, received symbol.

The DUDE uses a symbol-transformation matrix $\Lambda$ to model the non-uniform distortion effects of particular noise-induced symbol transitions. FIG. 6 displays one form of the symbol-transformation distortion matrix $\Lambda$. An element $d_{a_i \to a_j}$ of the matrix $\Lambda$ provides the relative distortion incurred by substituting the symbol $a_j$ in the noisy or recovered signal for the symbol $a_i$ in the clean signal. An individual column $j$ of the matrix $\Lambda$ may be referred to as a vector $\lambda_j$.

FIG. 7 illustrates computation of the relative distortion, with respect to the clean signal, expected from replacing a symbol $a_\alpha$ in a received, noisy signal by the symbol $a_x$. As shown in FIG. 7, element-by-element multiplication of the elements of the column vectors $\lambda_x$ and $\pi_\alpha$, an operation known as the Schur product of two vectors and designated in the current discussion by the symbol $\odot$, produces a column vector $\lambda_x \odot \pi_\alpha$ in which the i-th element is the product $d_{a_i \to a_x} p_{a_i \to a_\alpha}$ of a distortion and a probability reflective of the relative distortion expected in the recovered signal by replacing the symbol $a_\alpha$ in the noisy symbol by the symbol $a_x$ when the symbol in the originally transmitted, clean signal is $a_i$.

Figures 8, 9, 10:
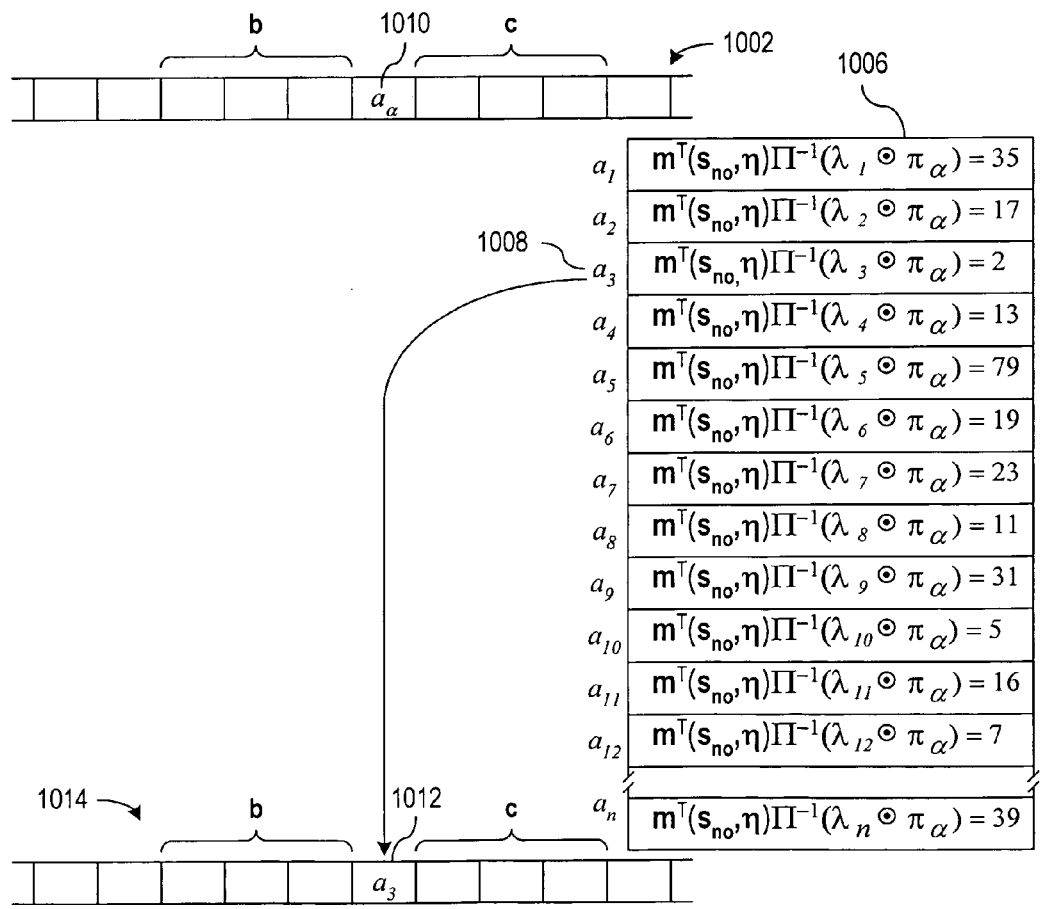
FIG. 8 illustrates use of the column vector to compute a distortion expected for replacing the center symbol $a_\alpha$ in the context $\eta$ in a noisy signal "$s_{no}$" by the replacement symbol $a_x$.
FIG. 9 shows estimation of the counts of the occurrences of symbols "$a_1$" to "$a_n$" for the clean signal.
FIG. 10 illustrates the process by which a discrete, universal denoiser denoises a noisy signal.

FIG. 8 illustrates use of column vector $\lambda_x \odot \pi_\alpha$ to compute a distortion expected for replacing $a_\alpha$ in the context $\eta$ in a noisy signal $s_{no}$ by the replacement symbol $a_x$. In the following expression and subsequent expressions, vectors $s_{no}$ and $s_{cl}$ respectively denote noisy and clean signals, and the row vector $q^T(s_{no}, s_{cl}, \eta)$ is defined to represent the occurrence counts for all symbols in the clean signal $s_{cl}$ that appear in the clean signal $s_{cl}$ at locations that correspond to locations in the noisy signal $s_{no}$ around which a particular context $\eta$ occurs. For one-dimensional data where a context $\eta$ includes preceding and subsequent symbols b and c, an element of the column vector $q(s_{no}, s_{cl}, b, c)$ is defined in Equation 1, where $s_{cl}[i]$ and $s_{no}[i]$ denote the symbols at location i in the clean and noisy signals, respectively; and $a_\alpha$ is a symbol in the alphabet A.

$$q(s_{no}, s_{cl}, b, c)[a_\alpha] = |\{i : s_{cl}[i] = a_\alpha, (s_{no}[i-k], s_{no}[i-k+1], \ldots, s_{no}[i-1]) = b, (s_{no}[i+1], s_{no}[i+2], \ldots, s_{no}[i+k]) = c\}|, \quad \text{Equation 1}$$

Each column vector $q(s_{no}, s_{cl}, \eta)$ includes n elements with indices ranging from $a_1$ to $a_n$, where n is the size of the symbol alphabet A, and in general, there will be one vector $q(s_{no}, s_{cl}, \eta)$ for each context $\eta$. The column vectors $q(s_{no}, s_{cl}, \eta)$ are, in general, not obtainable because the clean signal $s_{cl}$, upon which the definition depends, is unavailable. However, multiplication of the transpose vector $q^T(s_{no}, s_{cl}, \eta)$ of the column vector $q(s_{no}, s_{cl}, \eta)$ by the column vector $\lambda_x \odot \pi_\alpha$ produces the sum of the expected distortions in the column vector times the occurrence counts in the row vector that together provide a total expected distortion for replacing symbol $a_\alpha$ in the context $\eta$ in noisy signal $s_{no}$ by replacement symbol $a_x$. For example, the first term in the sum is produced by multiplication of the first elements in the row vector by the first element in the column vector, resulting in the first term in the sum being equal to $q^T(s_{no}, s_{cl}, \eta)[a_1](p_{a_1 \to a_\alpha} d_{a_1 \to a_x})$ or, in other words, a contribution to the total distortion expected from replacing $a_\alpha$ with $a_x$ in all occurrences of context $\eta$ in noisy signal $s_{no}$ when the corresponding symbol in signal $s_{cl}$ is $a_1$. The full sum gives the full expected distortion:

$$q^T(s_{no}, s_{cl}, \eta)[a_1](p_{a_1 \to a_\alpha} d_{a_1 \to a_x}) + q^T(s_{no}, s_{cl}, \eta)[a_2](p_{a_2 \to a_\alpha} d_{a_2 \to a_x}) + q^T(s_{no}, s_{cl}, \eta)[a_3](p_{a_3 \to a_\alpha} d_{a_3 \to a_x}) + \ldots + q^T(s_{no}, s_{cl}, \eta)[a_n](p_{a_n \to a_\alpha} d_{a_n \to a_x})$$

As discussed above, DUDE does not have the advantage of knowing the clean signal $s_{cl}$ that the noise-introducing channel changed to noisy signal $s_{no}$. However, DUDE can estimate the occurrence counts $q^T(s_{no}, s_{cl}, \eta)$ of symbols in the originally transmitted, clean signal $s_{cl}$ by multiplying the count vector $m^T(s_{no}, \eta)$ by the inverse channel matrix $\Pi^{-1}$.

FIG. 9 shows estimations of the counts $q^T(s_{no}, s_{cl}, \eta)$ of the occurrences of symbols $a_1$ to $a_n$ for the clean signal. More specifically, the estimate of the clean counts $q^T(s_{no}, s_{cl}, \eta)$ can be found by: analyzing the noisy signal to determine a count vectors $m^T(s_{no}, \eta)$; determining the inverse $\Pi^{-1}$ of the channel matrix $\Pi$; and multiplying count vector $m^T(s_{no}, \eta)$ on the right by the inverse channel matrix $\Pi^{-1}$.

The resulting expression $m^T(s_{no}, \eta) \Pi^{-1} (\lambda_x \odot \pi_\alpha)$ obtained by substituting $m^T(s_{no}, \eta) \Pi^{-1}$ for $q^T(s_{no}, s_{cl}, \eta)$ represents the DUDE's estimation of the distortion, with respect to the originally transmitted clean signal, produced by substituting $a_x$ for the symbol $a_\alpha$ within the context $\eta$ in the noisy signal $s_{no}$. DUDE denoises the noisy signal by replacing $a_\alpha$ in each occurrence of the context $\eta$ by the symbol $a_x$ that provides the least estimated distortion of the recovered signal with respect to the clean signal, using the above expression. In other words, for each $a_\alpha$ found in a context $\eta$, DUDE employs the transfer function $g(a_\alpha,\eta)$ of Equation 2 to determine how to replace that occurrence of the symbol $a_\alpha$. In some cases, the minimum distortion is produced by no substitution or, in other words, by the substitution $a_x$ equal to $a_\alpha$.

$$g(a_\alpha, \eta) = \operatorname*{argmin}_{a_x = a_1 \text{ to } a_n} [m^T(s_{no}, \eta)\Pi^{-1}(\lambda_x \odot \pi_\alpha)] \quad \text{Equation 2}$$

FIG. 10 illustrates a process by which DUDE denoises a received, noisy signal. First, as discussed above, DUDE models a noisy signal 1002 by compiling counts for all symbols $a_i$ within all context $\eta$ found. As discussed above, this modeling pass stores the counts in count vectors $m(s_{no}, \eta)$. Second, in a reconstruction process, DUDE again scans through the noisy signal 1002. For each symbol $a_\alpha$ in noisy signal $s_{no}$, DUDE identifies the context $\eta$ of the symbol $a_\alpha$ and determines the relative distortions of a recovered signal 1014 with respect to the clean signal $s_{cl}$ that would be produced by substituting for the target symbol $a_\alpha$ each possible replacement symbol $a_i$ in the range i=1 to n. These relative distortions are shown in table 1006 in FIG. 10 for symbol $a_\alpha$ detected in context $\eta$=[b, c] within noisy signal 1002. Examining the relative distortion table 1006, DUDE selects the replacement symbol with the lowest relative distortion, or, in the case that two or more symbols produce the same relative distortions, selects the first of the multiple replacement symbols with the lowest estimated distortion. In the example shown in FIG. 10, the replacement symbol 1008 has symbol value $a_3$. DUDE then replaces the central symbol $a_\alpha$ at position 1010 in noisy signal 1002 with the selected replacement symbol $a_3$ at the corresponding position 1012 in the recovered signal 1014. Note that recovered signal 1014 is generated from independent considerations of each symbol in noisy signal 1002, so that the replacement symbol selected in a previous step does not affect the choice for a replacement symbol in a next step for a different symbol. In other words, the replacement symbols can be generated in parallel, rather than after substitution of symbols directly into the noisy signal.

Context-Based Denoising with Enhanced Modeling Statistics

DUDE as discussed above can denoise one-dimensional or multi-dimensional data structures with any alphabet of symbols. However, best denoising performance is achieved when count vectors $m(s_{no},\eta)$ extracted from a noisy signal $s_{no}$ have component counts that are large enough to provide a reliable statistical characterization of the noisy signal $s_{no}$. However, for multi-dimensional data structures that may have a large alphabet and contexts including many symbols, the number of possible contexts $\eta$ can be so large that the noisy signal $s_{no}$ may only include a few or one occurrence of a particular context. DUDE thus may need techniques for more accurately characterizing the noisy signal $s_{no}$ when the occurrence counts for at least some of the contexts are too small to be statistically reliable. To overcome these statistical limitations, a denoising process can use each appearance of a context $\eta$ to simultaneously update the count vectors $m(s_{no},\eta_i)$ for many different contexts $\eta_i$. In particular, the count vectors $m(s_{no},\eta_i)$ for a set of contexts $\eta_i$ can be updated whenever the appearance of a symbol in a context $\eta$ indicates something about the statistical behavior of the other contexts $\eta_i$. The denoising process can thus provide better count statistics because each occurrence of a context may contribute to the determination of a large number of count vectors and the counts associated with respective count vectors will be larger. U.S. patent application Ser. No. 11/180,066 further describes methods and systems for simultaneously updating counts for multiple contexts.

One exemplary denoising process is based on DUDE and accumulates a single count vector for a context class that contains multiple contexts, for example, the set of contexts that produce the same value of a context function $C(\bullet)$. The context function $C(\bullet)$ is preferably chosen so that all contexts $\eta_i$ and $\eta_j$ that produce the same value $C(\eta_i)=C(\eta_j)$ of context function $C(\bullet)$ are expected to have similar or related statistics in the noisy signal $s_{no}$.

Known features of data represented by a signal can be used to identify the context classes that group together contexts having similar statistical characteristics. For example, one common feature that can be expected for many data sets is homogeneity or continuity. Homogeneity in general implies that particular sections of data include similar slow variations in symbol value even though separated sections of data may differ significantly. For example, data representing images, audio, or the time or spatial dependence of a system may exhibit some form of homogeneity. Accordingly, for many types of data, a context may be best characterized by its variations relative to a base value $\overline{\eta}$ chosen for the context $\eta$. The base value $\overline{\eta}$ can be a function of the context $\eta$. A context function $C(\bullet)$ exploiting this property can map contexts that differ in base value but have similar variations to the same context class. The context function $C(\bullet)$ can additionally use the symmetry in the data signal to identify additional contexts expected to have similar statistics and expand the context class to include contexts that have variations differing by symmetry transformations. In particular, data representing dependence on time or another linear parameter may have the same characteristics independent of whether considered in a forward or backward order. For data representing spatial variation, contexts that are rotations or reflections of each other may be expected to show similar statistics and therefore can be mapped to the same context class.

A broad context class or cluster can group contexts according to a quantized scalar characterization of each context. For example, an activity level of a context $\eta$ can be defined to be a scalar value that depends only on the differences between symbols in that context $\eta$. In particular, local gradients can be determined from the differences of adjacent symbols in a context $\eta$, and the activity level can then be found by quantizing the sum of the absolute values of the local gradients of the context $\eta$. Context classes grouping together the contexts having the similar activity level can be large because quantization of a scalar value can partition the contexts to a relatively small number of context classes. Use of large context classes can correspondingly improve modeling statistics. However, if context classes become too large the approximation that all contexts in the class have the same or similar statistics may be less accurate. As described further below, at least some of the statistical differences between sub-classes of a large context class can be accounted for during denoising when the count vectors for individual contexts are determined.

In order to provide an illustrative example, this section concentrates on the example of denoising continuous tone images, but it should be understood that denoising processes disclosed here can more generally be applied to other data signals. For the example of a signal representing a continuous tone image, context classes that group together contexts having the same texture or textures that differ by an expected symmetry of the image may be expected to have similar occurrence statistics because portions of the image away from object edges may be expected to have similar slow variations in color even though separated regions may differ significantly in base color. Accordingly, a context of a pixel value may be best characterized by the color or gray level texture or variations relative to a base color or gray level. A context function C(•) exploiting this property can map to the same context class contexts that differ in base color but have similar color variations.

FIG. 11 illustrates an example of a pixel map 1100 for a continuous tone grayscale image in which the symbols are integers from 0 to 255 and represent levels of image intensity. For the purpose of illustration, pixel map 1100 contains mostly clean data with relatively few symbols that are corrupted by noise, but more generally, a pixel map to which denoising is being applied could contain considerably more noise than is illustrated. In the example of FIG. 11, intensities in a background region of pixel map 1100 happen to vary almost continuously along a diagonal from the top-left to the bottom-right of pixel map 1100. In contrast, an object 1110 in pixel map 1100 has relatively high pixel values, which may correspond to object 1110 being in front of a darker background. Pixel map 1100 illustrates a common property of natural images in that objects and backgrounds tend to have regions in which color varies slowly and edges at which colors may change abruptly. Further, the slow variations in different regions are often the result of the same effects such as the illumination angle or other lighting effects.

A context function C(•) for a pixel map can group together context classes having similar variations in color or brightness. For example, context function C(•) can map to a context class C($\eta$) every context vector $\eta_i$ having a quantized version Q($\Delta\eta_i$) of a context vector difference $\Delta\eta_i$ equal to the same quantized vector Q($\Delta\eta$). In an exemplary embodiment, the context vector difference $\Delta\eta$ represents the component-by-component difference between a context $\eta$ and a base symbol $\bar{\eta}$ for context vector $\eta$. The base symbol $\bar{\eta}$ for a context vector $\eta$ in general is a symbol that characterizes the context overall and can be defined, for example, to be the maximum, the minimum, the mean, or a weighted or unweighted average of the component symbols in the context vector $\eta$.

Pixel map 1100 of FIG. 11 contains a neighborhood 1121 having a context vector $\eta_1$ and a base symbol $\bar{\eta}_1$. In this example, base symbol $\bar{\eta}_1$ is equal to 24, which is the average of the components of context vector $\eta_1$. The context vector difference $\Delta\eta_1$ has relatively small components, which is to be expected for a region having a continuous color variation. Quantization of context vector difference $\Delta\eta_1$ can, for example, set the small components of context vector difference $\Delta\eta_1$ equal to the nearest integer value, which in this case makes no change. In neighborhood 1121, the central pixel found in context $\eta_1$ happens to have a level equal to base symbol $\bar{\eta}_1$. More generally, the pixel value in context $\eta_1$ may be similar to the components of context vector $\eta_1$ when the context $\eta_1$ is away from an edge of an object, but the pixel in context $\eta_1$ could have any symbol value.

FIG. 11 also shows a neighborhood 1122 in pixel map 1100 having a context vector $\eta_2$ with a base symbol $\bar{\eta}_2$ equal to 36, which is the average of the components of context vector $\eta_2$. The pixel found in context $\eta_2$ in neighborhood 1122 is equal to 255 and in this example differs significantly from base symbol $\bar{\eta}_2$, possibly due to channel-induced noise. Although the component symbols of contexts $\eta_1$ and $\eta_2$ differ and base symbols $\bar{\eta}_1$ and $\bar{\eta}_2$ differ, the context vector differences $\Delta\eta_1$ and $\Delta\eta_2$ are the same after quantization, i.e., Q($\Delta\eta_1$)=Q($\Delta\eta_2$). As a result, the occurrences of contexts $\eta_1$ and $\eta_2$ can contribute to a class count vector M($s_{no}$,C($\eta$)) corresponding to a context class C($\eta$) including contexts $\eta_1$, $\eta_2$, and all other contexts that after a permitted symmetry transformation produce the same quantized context vector difference Q($\Delta\eta$). As will be understood from the following, the components of each class count vector M($s_{no}$,C($\eta$)) are not actually symbol counts but can be used as described below to determine symbol counts or probabilities for individual contexts $\eta$ in the context class C($\eta$).

The edge of object 1110 in pixel map 1100 crosses through a neighborhood 1123 having a context vector $\eta_3$. As described above, one rule for identifying a context class selects a base symbol $\bar{\eta}_3$ for a context vector $\eta_3$, e.g., the average of the components of context vector $\eta_3$. However, the average may not be a particularly useful or characteristic value for a context that contains an edge of an object, and predictors associated with edge location may be used to better identify base values of contexts in the same class. Predictors in general are known in image and audio compression, and the specifics of the particular predictor used in a denoising process may be selected according to the noisy channel or expected properties of the data being denoised. However, for illustration, a quantized context vector difference Q($\Delta\eta_3$) can still be calculated as shown in FIG. 11 using a base value $\bar{\eta}_3$ such as the average 49.25, which is not in the alphabet, or alternatively by selecting a symbol that is nearest the average and from the alphabet (e.g., 49). As illustrated in FIG. 11, the quantization that takes the context vector difference $\Delta\eta_3$ to a quantized vector difference Q($\Delta\eta_3$) can be a non-linear quantization that is coarser for large components. Quantized context vector difference Q($\Delta\eta_3$) clearly differs from quantized context vector differences Q($\Delta\eta_1$) and Q($\Delta\eta_2$) and therefore contributes to a different class count vector M($s_{no}$,C($\eta_3$)). This distinction of context classes is desirable because the statistics of a context vector $\eta_3$ that is at an edge of an object 1110 may be expected to differ from the statistics of context vectors $\eta_1$ and $\eta_2$ that are away from any edges.

Each class count vector M($s_{no}$,C($\eta$)) as noted above can be updated for each occurrence of a context $\eta$ or any other context $\eta'$ providing the same value of the context function, i.e., any context $\eta'$ such that C($\eta'$)=C($\eta$). The particular component count of class count vector M($s_{no}$,C($\eta$)) updated for an occurrence of a context in the class C($\eta$) depends on the symbol value a found in the context $\eta$. In one embodiment, the updated component when a symbol a is found in a context $\eta$ has an index corresponding to a difference between the symbol a and an index base symbol $\bar{\eta}$, where the index base symbol $\bar{\eta}$ depends on the context $\eta$. Index base symbol $\bar{\eta}$ in general may be the same as or different from the base symbol $\bar{\eta}$ used to determine a context vector difference $\Delta\eta$. In the case where a symbol difference a $-\bar{\eta}$ identifies the component, the class count vector M($s_{no}$,C($\eta$)) can be of dimension 2n where n is the number of symbols in the alphabet. Accordingly, the count vectors m($s_{no}$,$\eta$) having the proper dimension for use in the DUDE may have fewer components than class count vectors M($s_{no}$,C($\eta$)).

Another view of the exemplary modeling process is that for each symbol that occurs in context $\eta_1$, which has an index base symbol $\bar{\eta}_1$, all count vectors m($s_{no}$,$\eta$) that are associated with the same context class as context $\eta_1$ are simultaneously updated. In an exemplary embodiment, for each appearance of symbol a in context $\eta_1$, the incremented count in a count vector m($s_{no}$,$\eta_2$) for a context $\eta_2$ having index base symbol $\bar{\eta}_2$ will be the count vector component corresponding to symbol a $-\bar{\eta}_1+\bar{\eta}_2$, which may be clamped at the extreme range of the alphabet. As a result, two contexts $\eta_1$, and $\eta_2$ in the same context class $C(\eta)$ have the substantially same count vector $m(s_{no},\eta)$ except that the components of count vector $m(s,\eta_1)$ are shifted by $\overline{\eta}_1-\overline{\eta}_2$ relative to the components of count vector $m(s,\eta_2)$. This process is equivalent to defining class count vectors $M(s_{no},C(\eta))$ for context classes $C(\eta)$.

The count vector $m(s_{no},\eta)$ for any context $\eta$ can be derived from the corresponding class count vector $M(s_{no},C(\eta))$. In particular, to determine count vector $m(s_{no},\eta)$, the component positions in class count vector $M(s_{no},C(\eta))$ can be shifted by index base symbol $\overline{\eta}$ for context $\eta$, so that the distribution of counts is centered at index base symbol $\overline{\eta}$. Components of the shifted class count vector $M(s_{no},C(\eta))$ having indices outside the index range are then clamped, e.g., added to components having indices 1 or n, to thereby produce the count vector $m(s_{no},\eta)$. Once count vector $m(s_{no},\eta)$ is known, DUDE can operate in the manner described above.

Denoising of Data Containing Impulse Noise

The general techniques described for the DUDE and improving modeling statistics can be employed for denoising data received through a channel that produces impulse noise. However, the specific properties of impulse noise allow for changes or improvements to the general processes, and further alteration of the DUDE can be used to better compensate for the non-additive nature of impulse noise.

Figure 12:
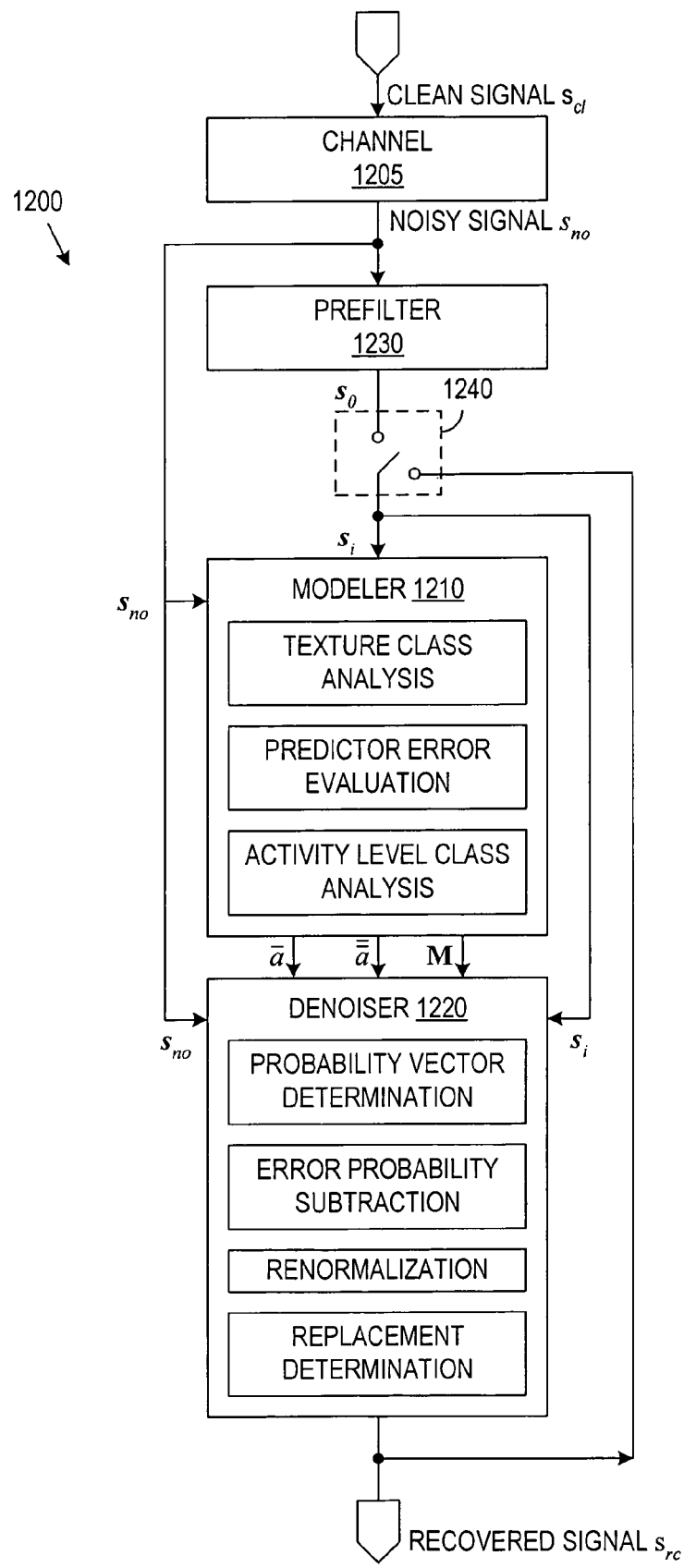
FIG. 12 is a block diagram of a system in accordance with an embodiment of the invention for removing impulse noise.

FIG. 12 illustrates a block diagram for a system 1200 according to an embodiment using context classes and subclasses for denoising of a noisy signal $s_{no}$ containing impulse noise. It should be noted that the use of context classes and subclasses as described herein is not limited to denoising of signals containing impulse noise but may be more generally applied to improve the modeling or prediction of a noisy signal. As illustrated, system 1200 includes a modeler 1210, a denoiser 1220, a prefilter 1230, and a selection unit 1240. In general, system 1200 or its components 1210, 1220, 1230, and 1240 can be implement using software or firmware routines executed in a special-purpose or general-purpose computer, such software when stored on a machine-readable medium such as an electronic memory or storage disk, hard-wired units electronically performing the tasks described below, or any combination of these. In an exemplary embodiment, noisy signal $s_{no}$ has an alphabet including digital integers in a range, e.g., 0 to 255, and a computer implements system 1200 by executing software that performs the functions of components 1210, 1220, 1230, and 1240.

A noise-introducing channel 1205 in FIG. 12 represents a physical system such as a transmission network or a storage system that introduces impulse noise by randomly erasing some of the symbols in a clean signal $s_{cl}$ and replacing the erased symbols with one or more error symbols to produce noisy signal $s_{no}$. As a specific example described for illustrative purposes, the effect of channel 1205 on clean signal $s_{cl}$ will be assumed to be characterized by the channel matrix Π shown in FIG. 2D in the specific case where each error has the same probabilities p/2 of producing a salt or pepper error value. In particular, in this case, channel 1205 erases a symbol with a probability p and has equal probabilities p/2 of replacing the erased symbol with the maximum symbol (255) or the minimum symbol (0). However, techniques described here are not limited to this example but can be adapted to more generalized impulse noise, for example, in which the probabilities of replacement with different error symbols are not equal or in which one or more of the error symbols is not the maximum or minimum of the alphabet.

Channel 1205 may introduce other types of noise in addition to impulse noise. For example, channel may introduce both impulse noise and additive noise such as Gaussian noise. In such cases, system 1200 can remove the impulse noise while leaving other types of noise, and additional denoising, e.g., DUDE using a channel matrix selected for the additional noise, can be applied before or after the denoising adapted for impulse noise.

Figure 13:
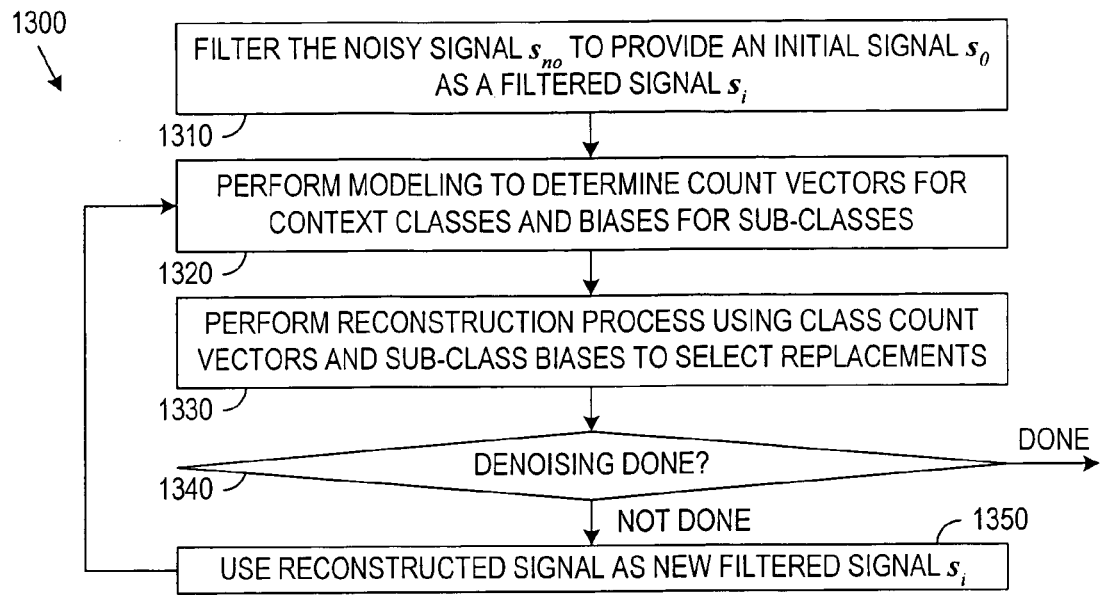
FIG. 13 is a flow diagram of a DUDE process in accordance with an embodiment of the invention capable of denoising a signal containing impulse noise.

FIG. 13 is a flow diagram of a denoising process 1300 that system 1200 can execute for denoising of noisy signal $s_{no}$. Process 1300 starts in step 1310 with prefilter 1230 performing a filter operation on noisy signal $s_{no}$ to produce an initial filtered signal $s_0$. A feature of impulse noise that facilitates denoising is that symbols that are not the error symbols can be identified as being clean. Prefilter 1230 in system 1200 system can thus initially filter noisy signal $s_{no}$ by acting only on the symbols that is possibly noise, e.g., the maximum or minimum symbols. For example, prefilter 1230 can replace the symbols that may be impulse noise with a prediction derived from the neighboring symbols and leave unchanged the other symbols that are not impulse noise. Some examples of the filter operations that prefilter 1230 can use to replace each symbol that is possibly impulse noise include the average or median of the symbols in a predefined neighborhood of the symbol, a more complex prediction operation that addresses abrupt changes such as may occur for symbols corresponding to pixels at the edge of an object in an image, or any desired predictor thought to reasonably predict a value commonly found in a context.

Step 1310 preferably produces an initial filtered signal $s_0$ that is closer to clean signal $s_{cl}$ that is noisy signal $s_{no}$, but prefilter 1230 will generally introduce distortion by incorrectly changing some symbols from their clean values. For example, in a continuous tone image, prefilter 1230 may change pixels that should remain black or white to another shade. However, filtered signal $s_0$ from prefilter 1230 can be used to better define or identify contexts that are statistically similar, so step 1310 selects signal $s_0$ as an initial filtered signal $s_i$ that is used as described further below.

Step 1320 is a modeling process that modeler 1210 can perform to analyze noisy signal $s_{no}$. During modeling process 1320, modeler 1210 receives noisy signal $s_{no}$ and filtered signal $s_i$ (initially signal $s_0$) and generates class count vectors M and biases $\overline{a}$ for use in denoiser 1220. Modeler 1210 may also produce predictions $\overline{a}$ that denoiser 1220 uses as described below for determining count or probability vectors for individual contexts, but denoiser 1220 can alternatively determined each prediction $\overline{a}$ directly from the context found in filtered signal $s_i$. The biases $\overline{a}$ are associated with subclasses of the classes for which the class count vectors M are generated. More specifically, modeling process 1320 can accumulate class count vectors M for large context classes, e.g., context classes identified by the activity level of the contexts, and at the same time evaluate differences between the statistical behaviors of the subclasses in each class, e.g., contexts identified by both their activity levels and textures. The use of large classes can increase the size of the counts in the class count vectors M and improve the statistics of the generated count vectors, while the evaluation of the biases $\overline{a}$ of the subclasses can indicate and account for differences between the statistics of the subclasses. An example of a suitable modeling process 1320 is described in more detail below with reference to FIG. 14.

A reconstruction process 1330 of FIG. 13 uses the model information from modeling process 1320 to identify each replacement symbol that is used in place of the error symbols when found in evaluated contexts. In a manner similar to that described above, determination of a transfer function $g(a_\alpha,\eta)$ that identifies the replacement symbols for DUDE can include estimating probabilities $q^T(s_{no}s_{cl},\eta)[a_i]$ of occurrences of symbols $a_i$ in the clean signal $s_{cl}$ in positions corresponding to contexts $\eta$ in filtered signal $s_f$. The estimate can be found as described above by determining the inverse $\Pi^{-1}$ of the channel matrix $\Pi$ and multiplying each count vector $m^T(s_{no},\eta)$ by the inverse channel matrix $\Pi^{-1}$. However, a channel that introduces impulse noise permits estimation of count or probability vectors $q^T(s_{no},s_{cl},\eta)$ without calculation of the matrix inverse or a large number of matrix multiplications. In particular, a desired vector $q(s_{no},s_{cl},\eta)$ can be determined from the corresponding count vectors $m(s_{no},\eta)$ by normalizing the count vector $m(s_{no},\eta)$ as a probability vector (having components that sum to 1), subtracting the error probabilities, e.g., $p_p$ and $p_s$, from the respective components of the probability vector, and then renormalizing the resulting vector to produce an estimated probability vector corresponding to vector $q(s_{no},s_{cl},\eta)$.

Evaluation of the cost or distortion introduced by replacement during step 1330 also simplifies for a channel matrix associated with impulse noise. For example, the replacement symbol found from a probability distribution associated with a vector $q(s_{no},s_{cl},\eta)$ will be the mean or average symbol of the distribution for $L_2$ distance minimization or the median symbol of the distribution for $L_1$ distance minimization. The result of reconstruction process 1330 is a recovered signal $s_{rc}$ that generally contains replacement symbols for some of the error symbols.

After reconstruction process 1330 in FIG. 13, a decision step 1340 determines whether the denoising process 1300 is finished. If not, step 1350 selects recovered signal $s_{rc}$ as the new filtered signal $s_f$, and process 1300 repeats steps 1320 to 1340. Each iteration or repetition of steps 1320 to 1340 uses the original noisy signal $s_{no}$ and a new filtered signal $s_f$. Decision step 1340 can determine that process 1300 is done using any desired criterion. For example, process 1300 may be considered complete after a fixed number of iterations, or if visual feedback is available, the iterations may be stopped once no further improvement in the appearance of the data is observed.

Figure 14:
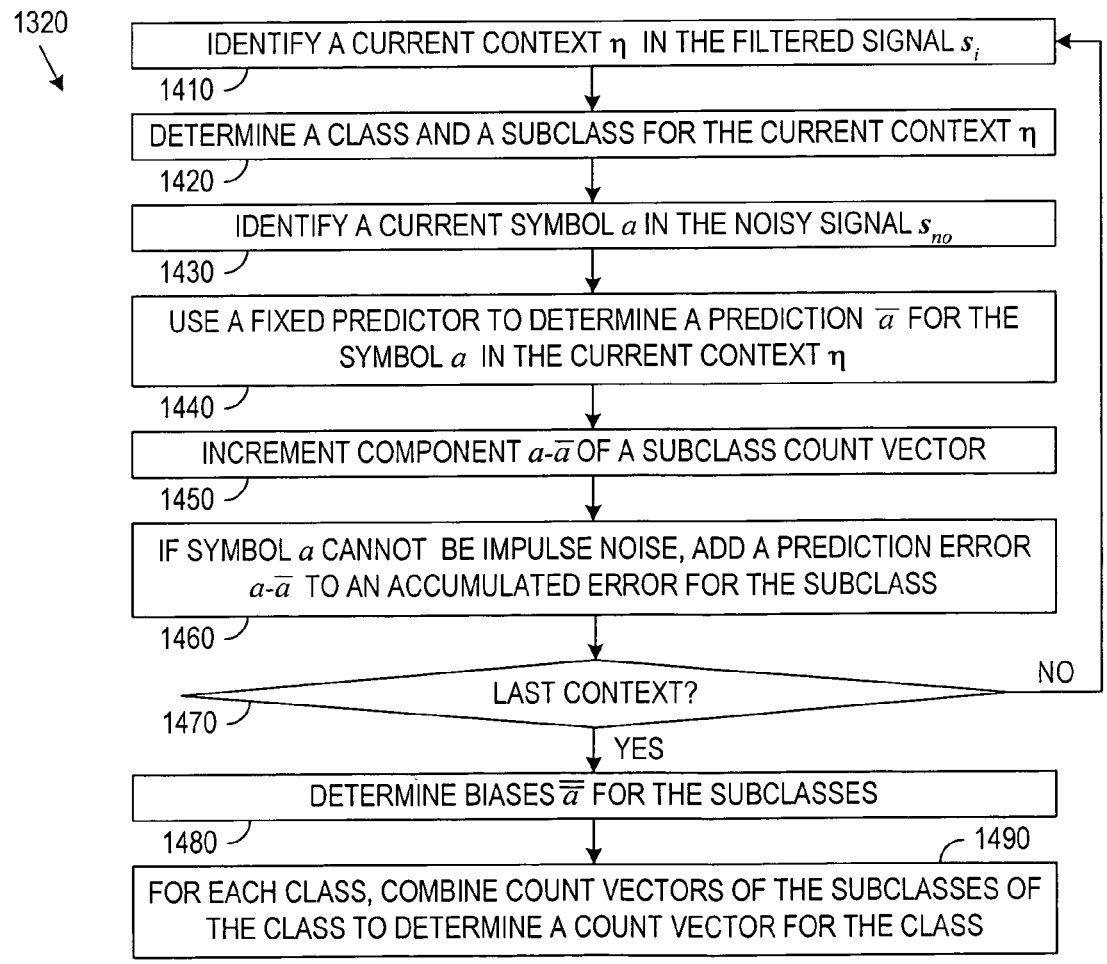
FIG. 14 is a flow diagram of an embodiment of a modeling process suitable for use in the DUDE process of FIG. 13.

FIG. 14 is a flow diagram of one embodiment of a modeling process 1320 suitable for use in process 1300 of FIG. 13. As shown in FIG. 14, this embodiment begins with a step 1410 of identifying a current context $\eta$ in the filtered signal $s_f$. Step 1420 can then determine a class $C(\eta)$ and a subclass $C_S(\eta)$ for the current context $\eta$. A context subclass $C_S(\eta)$ is defined to be a context class that is also a subset of a larger context class $C(\eta)$, so that the collection of subclasses $C_S(\eta)$ of a class $C(\eta)$ form a partition of class $C(\eta)$.

One technique for determining a class $C(\eta)$ and a subclass $C_S(\eta)$ for a context $\eta$ determines an activity level $AL(\eta)$ and a texture bitmap $T(\eta)$. The activity level $AL(\eta)$ of a context $\eta$ can be determined, for example, by calculating the sum of the absolute values of the differences between adjacent symbols in the context $\eta$ and then quantizing the resulting sum. The activity level $AL(\eta)$ thus identifies the magnitude of the variation of symbols in the context $\eta$ but does not provide detailed information regarding the texture of the context $\eta$. The symbols found in contexts having the same activity level may, however, be expected to have similar statistics or relation to the symbols of the context. Accordingly, context class $C(\eta)$ can be defined as a set of contexts having the same activity level.

Subclass $C_S(\eta)$ in an exemplary embodiment can be identified as containing the contexts that are in class $C(\eta)$ and that also satisfy a second condition suitable for partitioning of the class. For example, when class $C(\eta)$ corresponds to the contexts having the same activity level, subclass $C_S(\eta)$ can be defined as contexts that have the same activity level and that also have the same texture bitmap. The texture bitmap is a binary value that attempts captures the basic texture pattern of the context. A texture bit map may be constructed by: assigning a bit value 0 or 1 to each symbol in the context according to whether or not the symbol is greater than the base symbol $\bar{\eta}$ for the context; and then constructing a multi-bit value (i.e., the texture bit map) by ordering the bits assigned to the symbols in an order that depends on the positions of the symbols in the context (e.g., in a spiral ordering beginning at the center). The class containing all contexts that have a particular activity level and a particular texture bit map is a subclass of the class containing contexts with that activity level.

The use of activity levels and texture bit maps to identify context classes and subclasses is only one example technique. Another technique assigns context $\eta$ to a texture subclass $C_S(\eta)$ by subtracting a base value $\bar{\eta}$ from the components of context $\eta$, performing symmetry operations on the resulting context difference $\Delta\eta$ if necessary to place the components context difference $\Delta\eta$ in a desired ordering, e.g., with the largest components in the specific quadrants of context difference $\Delta\eta$, and then quantizing the result. All contexts $\eta$ providing the same quantized result are placed together in the same subclass $C_S(\eta)$. Context classes $C(\eta)$ can then be defined to be a union of subclasses, e.g., subclasses that that have the same energy or activity level.

Step 1430 in process 1320 of FIG. 14 identifies a current symbol a found in noisy signal $s_{no}$ at a location corresponding to the current context $\eta$, and step 1440 uses a fixed predictor to determine a predicted symbol $\bar{a}$ expected to be in the current context $\eta$. Predicted symbol $\bar{a}$ may, for example, be equal to the index base value $\bar{\eta}$ for the current context $\eta$. The fixed predictor more generally can be any function of the context $\eta$, including but not limited to an average or median of symbols in the context or a symbol value found using a more complex predictor. Step 1430 can then increment a component having index $a - \bar{a}$ in a subclass count vector $M(s_{no},s_i,C_S(\eta))$ associated with subclass $C_S(\eta)$ identified in step 1420. If the current symbol a is not an error symbol, step 1460 determines a prediction error $a - \bar{a}$ and adds the prediction error $a - \bar{a}$ to an accumulated error associated with the current subclass $C_S(\eta)$.

Decision step 1470 determines whether scanning of noisy signal $s_{no}$ is complete by determining whether the last context in filtered signal $s_f$ has been selected. If not, modeling process 1320 branches from step 1470 to step 1410 and identifies the next context from filtered signal $s_f$. After step 1470 when all of the contexts have been selected and processed, modeling process 1320 will have produced subclass count vectors $M(s_{no},s_i,C_S(\eta))$ and accumulated prediction errors for the respective subclasses $C_S(\eta)$, and modeling process 1320 then moves from step 1470 to step 1480.

Step 1480 determines respective biases $\bar{a}(C_S(\eta))$ for the subclasses $C_S(\eta)$. Each bias $\bar{a}(C_S(\eta))$ can be calculated by dividing the accumulated prediction error for the subclass $C_S(\eta)$ by the number of occurrences of subclass $C_S(\eta)$ of symbols that cannot be impulse noise, e.g., the number of occurrences in subclass $C_S(\eta)$ of symbols other than the maximum and minimum symbol.

Step 1490 generates class count vectors $M(s_{no},s_i,C(\eta))$ for classes $C(\eta)$ through combination of one or more subclass count vectors $M(s_{no},s_i,C_S(\eta))$. In particular, each subclass $C_S(\eta)$ is a subset of a specific class $C(\eta)$, and each class count vector $M(s_{no},s_i,C(\eta))$ can be a sum of shifted subclass count vectors $M(s_{no},s_i,C_S(\eta))$ over the set of subclasses $C_S(\eta)$ that are subsets of the class C(η). Preferably, the shift for each subclass count vector M($s_{no}$,$s_i$,$C_S$(η)) is the bias $\bar{a}(C_S(η))$ for the subclass $C_S$(η). Upon completion of step 1490, class count vectors M($s_{no}$,$s_i$,C(η)) and subclass biases $\bar{a}(C_S(η))$ are ready for the reconstruction process 1330.

Figure 15:
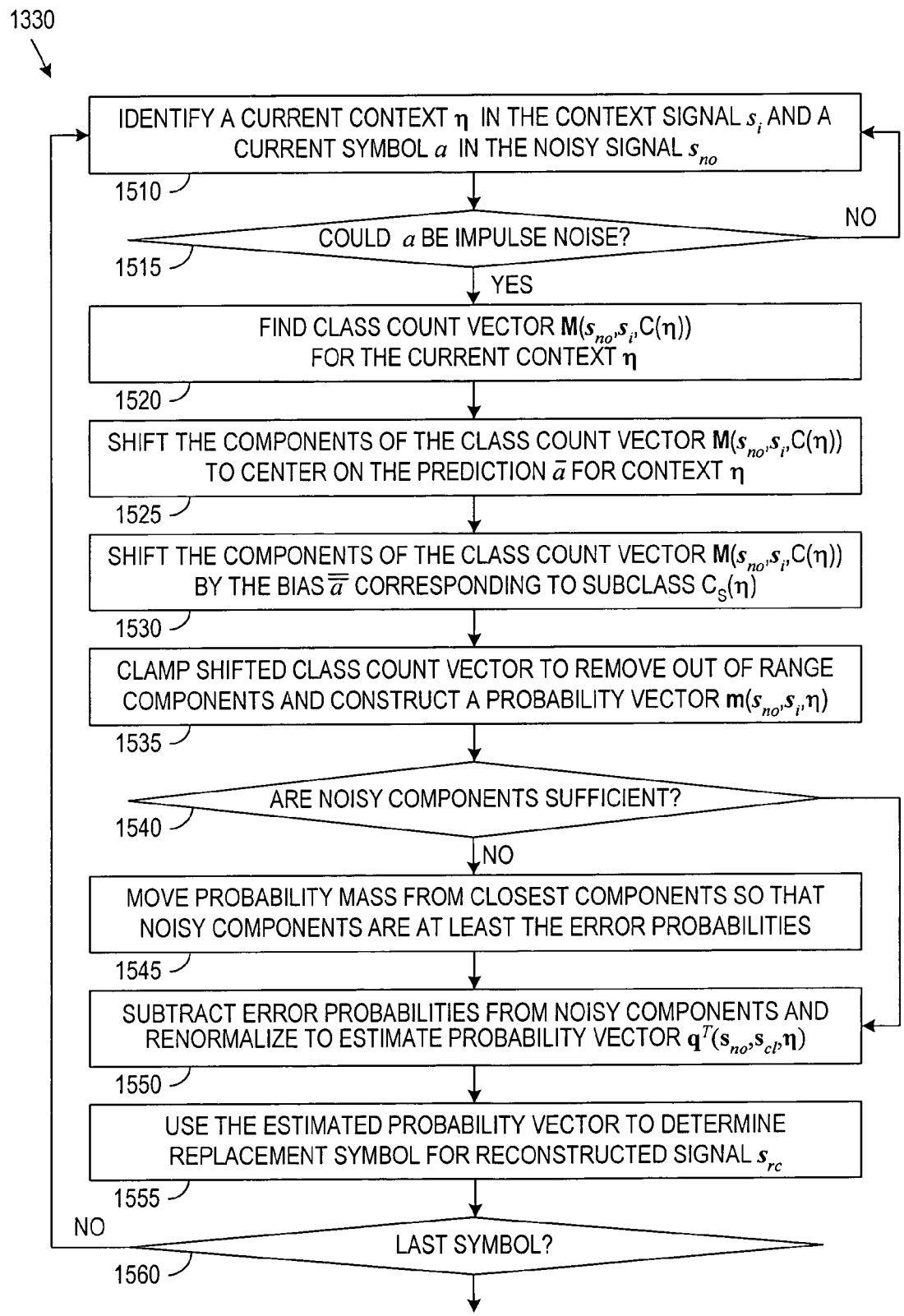
FIG. 15 is a flow diagram of a reconstruction process suitable for use in the DUDE process of FIG. 13.

FIG. 15 is a flow diagram of an embodiment of reconstruction process 1330 suitable for denoising process 1300 of FIG. 13. Reconstruction process 1330 scans through noisy signal $s_{no}$ and generates a recovered signal $s_{rc}$. In reconstruction process 1320, step 1510 identifies a current context η from filtered signal $s_i$ and a current symbol a from a corresponding position in noisy signal $s_{no}$. Decision step 1515 then determines whether current symbol a could be impulse noise, e.g., is the minimum or maximum symbol. If current symbol a is clearly not impulse noise, no replacement is needed, and process 1330 branches from step 1515 back to step 1510 and selects another current context η and current symbol a. If the current symbol a could be impulse noise, process 1330 proceeds from step 1515 to step 1520.

Step 1520 identifies the class count vector M($s_{no}$,$s_i$,C(η)) that modeling process 1320 found for the current context η, and then steps 1525, 1530, and 1535 construct a count vector m($s_{no}$,$s_i$,η) for the current context η. More specifically, step 1525 determines a prediction $\bar{a}$ for the symbol in context η and shifts the components of class count vector M($s_{no}$,$s_i$,C(η)) so that the count distribution is centered on prediction $\bar{a}$. Step 1530 determines the bias $\bar{a}(C_S(η))$ for the subclass $C_S(η)$ of context η and further shifts class count vector M($s_{no}$,$s_i$,C(η)) so that the distribution is centered on component $\bar{a}+\bar{a}(C_S(η))$. Step 1535 then constructs a probability vector m($s_{no}$,η) from the shifted energy class count vector by clamping components having indices that are out of range (i.e., adding each component with an out-of-range index into the component having the nearest in-range index) and normalizing the resulting count vector to produce a probability vector, i.e., a vector with components summing to 1.

Step 1540 determines whether the components corresponding to possible impulse noise in the resulting probability vector m($s_{no}$,η) are of sufficient magnitude. In the probability vector m($s_{no}$,η) associated with any context η, each component corresponding to a possible error value, e.g., components corresponding to the maximum and minimum symbols, should have a magnitude that is at least as big as the probability that the noisy channel changed a symbol to that error value. For example, if the channel is represented by channel matrix Π of FIG. 2D, components corresponding to the pepper-noise symbol in each probability vector m($s_{no}$,η) should be at least $p_p$, where $p_p$ is the probability of the channel replacing a symbol with a pepper-noise error symbol. However, the components of probability vectors m($s_{no}$,η) corresponding to the error symbols may be smaller than the error probabilities because counts used to determine probability vectors m($s_{no}$,η) may be artificially constructed using counts for many contexts and depend on statistical variations and differences between contexts in the same class. If the noisy components are too small, process 1330 moves probability mass from the closest components to the noisy components until the noisy components are sufficiently large, e.g., the components corresponding to the salt and pepper symbols are equal to $p_s$ and $p_p$. If the noisy components are already sufficient, process 1330 moves from step 1540 directly to step 1550.

Step 1550 provides a simplified method for estimating probabilities $q^T(s_{no},s_{cl},η)[a_i]$ of occurrences of symbols $a_i$ in the clean signal $s_{cl}$ in positions corresponding to contexts η in filtered signal $s_i$. For a channel introducing impulse noise, multiplication of the probability vectors m($s_{no}$,η) by inverse matrix $Π^{-1}$ is not required because the distribution in noisy signal $s_{no}$ of symbol values associated with context η is the same as the distribution in clean signal $s_{cl}$ of symbol values associated with context η except for the increase in occurrences of error values. Step 1550 can thus determine an estimated probability vector $\hat{q}^T(s_{no},s_{cl},η)$ by subtracting the error probabilities, e.g., subtracting p/2 from the components of probability vectors m($s_{no}$,η) corresponding to the maximum and minimum symbols, and then renormalizing to make the result a probability vector $\hat{q}^T(s_{no},s_{cl},η)$.

Step 1555 uses the estimated probability vector $\hat{q}^T(s_{no},s_{cl},η)$ from step 1550 to select a replacement value a' to be used in place of the possible noise symbol a that is in noisy signal $s_{no}$ and associated with context η in filtered signal $s_i$. (As noted in general for the DUDE, the replacement symbol a' may be equal to the current symbol α.) The selection of the replacement symbol in general depends on the symbol-transformation distortion matrix Λ as described above. However, when the distortion caused by incorrectly replacing a symbol is proportional to the absolute difference between the correct and incorrect symbols, i.e., for an $L_1$ measure of distortion, the symbol that minimizes distortion is the median of the distribution defined by probability vector $q^T(s_{no},s_{cl},η)$. If the distortion is proportional to the square of the difference, the symbol that minimizes distortion is the mean of the distribution defined by probability vector $q^T(s_{no},s_{cl},η)$. Replacement values may thus be found from mean or median of the distribution defined by the estimated probability vector $\hat{q}^T(s_{no},s_{cl},η)$. More generally, the replacement symbol can be determined from a distribution that is proportional to estimated probability vector $\hat{q}^T(s_{no},s_{cl},η)$, but not normalized. Accordingly, renormalization in step 1550 is not required.

Step 1560 determines whether the last symbol of noisy signal $s_{no}$ has been considered for replacement. If not, process 1330 branches back to step 1510 to select another symbol and context. After the last symbol, reconstruction process 1330 has completed generation of reconstructed signal $s_{rc}$.

Although the invention has been described with reference to particular embodiments, the description is only an example of the invention's application and should not be taken as a limitation. For example, although the above embodiments have been described with reference to particular process flows and steps, such process are subject to wide variations. For example, the order of steps in such processes can be varied, and particular steps may be omitted, combined into a single operation, or divided into multiple steps. Further, where repetition of steps, occurs calculated results from previous repetitions may be saved and accessed rather than duplicating the processing steps. Various other adaptations and combinations of features of the embodiments disclosed are within the scope of the invention as defined by the following claims.

What is claimed is:

1. A process for denoising a noisy signal containing impulse noise, the process comprising:
   analyzing, by a processor or computer, the noisy signal to determine a first vector that that is associated with a first context and has components respectively corresponding to symbols of an alphabet used in the noisy signal, wherein the first vector is a probability vector and the components indicate respective probabilities of the symbols appearing in the noisy signal within a noisy context associated with the first context;

constructing a second vector by subtracting from each of the components of the first vector a probability that the corresponding symbol is impulse noise; and replacing each symbol that may be impulse noise and is found in the noisy signal within the noisy context with a replacement symbol derived from the second vector to thereby produce a recovered signal.

2. The process of claim 1, wherein the replacement symbol is corresponds to a mean of a distribution indicated by the components of the second vector.

3. The process of claim 1, wherein the replacement symbol is corresponds to a median of a distribution indicated by the components of the second vector.

4. The process of claim 1, wherein analyzing the noisy signal comprises:
  selecting a current symbol from the noisy signal;
  determining a prediction for the current symbol based on a current context associated with the current symbol;
  identifying a current subclass corresponding to the current context;
  updating a component of a count vector that corresponds to the current subclass;
  only if the current symbol cannot be impulse noise, combining a difference between the current symbol and the prediction into a value for use in determining a bias associated with the current subclass;
  repeating the above steps a plurality of times to generate a plurality of the count vectors respectively for a plurality of the subclasses;
  determining a plurality of the biases respectively for the plurality of subclasses; and
  for each class in a plurality of classes, combining the count vectors for subclasses contained in the class to generate a class count vector for the class; and
  constructing the first vector from a class count vector corresponding to a one of the classes that includes the first context.

5. The process of claim 1, wherein before subtracting the probabilities of the symbols being impulse noise from the corresponding components of the first vector, the method further comprise for each component of the first vector corresponding to a symbol that may be impulse noise,
  comparing the component to the probability that the corresponding symbol is impulse noise; and
  in response to the component being less than the probability that the corresponding symbol is impulse noise, increasing the component by an amount needed to make the component equal to the probability and correspondingly decreasing one or more neighboring components of the first vector so that the first vector remains a probability vector.

6. The process of claim 1, wherein applying a selective median filter transforms the noisy context into the first context, and the selective median filter replaces symbols that may be impulse noise with a median of symbols in a neighborhood of the symbol and that leaves unchanged symbols that cannot be impulse noise.

7. The process of claim 1, further comprising repeating the steps of claim 1 one or more times, wherein for each repetition, the first context is a context found in the recovered signal of a previous repetition at a location corresponding to the noisy context.

8. A machine-readable media containing instructions that when executed perform the process of claim 1.

9. A denoising process for a noisy signal containing impulse noise, comprising:
  a modeling process that a processor or computer performs by executing steps including:
    selecting a current symbol from the noisy signal;
    determining a prediction for the current symbol based on a current context associated with the current symbol;
    identifying a current subclass corresponding to the current context;
    updating a component of a count vector that corresponds to the current subclass;
    only if the current symbol cannot be impulse noise, combining a difference between the current symbol and the prediction into an accumulated error for use in determining a bias associated with the current subclass;
    repeating the above steps a plurality of times to generate a plurality of the count vectors for the plurality of subclasses;
    determining a plurality of the biases for the plurality of subclasses; and
    for each class in a plurality of classes, combining the count vectors for subclasses contained in the class to generate a class count vector for the class; and
  a reconstruction process that includes using the class count vectors, the biases, and the predictions to determine whether to replace a symbol in the noisy signal when generating a recovered signal.

10. The process of claim 9, wherein identifying a current subclass comprises determining an activity level and a texture for the current context, wherein the subclass identified contains contexts for which the activity levels are all the same and the textures are all the same.

11. The process of claim 10, wherein each of the classes corresponds to a set of contexts having activity levels in the same quantization bin.

12. The process of claim 10, wherein determining the texture comprises:
  assigning a bit value to each symbol in the context according to whether or not the symbol is greater than a base symbol; and
  assembling the bit values assigned to the symbols to construct a binary value representing the texture.

13. The method of claim 12, wherein the base symbol for the current context is equal to the prediction for the current context.

14. The process of claim 9, wherein combining the count vectors to generate the class count vector comprises combining a first component of the count vector for a first of the subclasses with a second component of the count vector of a second of the subclasses, wherein positions of the first and second components in the respective count vectors depend on the biases of the first and second of the subclasses.

15. The process of claim 9, wherein the reconstruction process comprises:
  selecting a current symbol from the noisy signal;
  identifying a current context for the current symbol;
  shifting components of the class count vector for the class containing the current context by an amount that depends on the prediction and the bias for the current context;
  constructing a probability vector from the class count vector as shifted;
  subtracting error probabilities from corresponding components of the probability vector; and
  determining the replacement symbol from a distribution represented by the probability vector after the subtraction.

16. The process of claim 15, wherein before subtracting the error probabilities, the method further comprise for each component of the probability vector corresponding to a symbol that may be impulse noise, comparing the component to the error probability of the corresponding symbol; and in response to the component being less than the error probability of the corresponding symbol, increasing the component by an amount needed to make the component equal to the error probability and correspondingly decreasing one or more neighboring components of the probability vector.

17. The process of claim 9, wherein the current context is in a filtered signal at a position corresponding to the current symbol in the noisy signal.

18. The process of claim 17, further comprising generating the filtered signal from the noisy signal by applying a selective filter that only changes symbols that could be impulse noise.

19. The process of claim 18, wherein the selective filter is a selective median filter.

20. A machine-readable media containing instructions that when executed perform the process of claim 9.

21. A denoising process comprising:

a modeling process that processor or computer performs by executing steps including:

selecting a current symbol from a noisy signal;

determining a prediction for the current symbol based on a current context associated with the current symbol;

identifying a current subclass corresponding to the current context;

updating a component of a count vector that corresponds to the current subclass;

combining a difference between the current symbol and the prediction into a value for use in determining a bias associated with the current subclass;

repeating the above steps a plurality of times to generate a plurality of the count vectors for the plurality of subclasses;

determining a plurality of the biases for the plurality of subclasses; and for each class in a plurality of classes, combining the count vectors for subclasses contained in the class to generate a class count vector for the class; and a reconstruction process that includes using the class count vectors and the biases to determine whether to replace a symbol in the noisy signal when generating a recovered signal.

22. The process of claim 21, wherein combining the count vectors to generate a class count vector comprises combining a first component of the count vector for a first of the subclasses with a second component of the count vector of a second of the subclasses, wherein positions of the first and second components in the respective count vectors depend on the biases of the first and second of the subclasses.

23. The process of claim 21, wherein the reconstruction process comprises:

selecting a current symbol from the noisy signal;

identifying a current context for the current symbol;

shifting components of the class count vector for the class containing the current context by an amount that depends on the prediction and the bias for the current context;

constructing a probability vector from the class count vector as shifted; and determining the replacement symbol using the probability vector constructed.

* * * * *

UNITED STATES PATENT AND TRADEMARK OFFICE
CERTIFICATE OF CORRECTION

PATENT NO. : 7,656,942 B2  Page 1 of 1
APPLICATION NO. : 11/490725
DATED : February 2, 2010
INVENTOR(S) : Ignacio Ramirez et al.

It is certified that error appears in the above-identified patent and that said Letters Patent is hereby corrected as shown below:

In column 18, line 61, in Claim 1, delete "that that" and insert -- that --, therefor.

In column 21, line 27, in Claim 21, delete "that processor" and insert -- that a processor --, therefor.

Signed and Sealed this

Ninth Day of November, 2010

David J. Kappos
*Director of the United States Patent and Trademark Office*